(12) United States Patent
Su et al.

(10) Patent No.: US 11,895,618 B2
(45) Date of Patent: Feb. 6, 2024

(54) REFERENCE SIGNAL RECEIVING AND SENDING METHOD, DEVICE, AND SYSTEM

(71) Applicant: HUAWEI TECHNOLOGIES CO., LTD., Shenzhen (CN)

(72) Inventors: Yuwan Su, Shenzhen (CN); Zhe Jin, Beijing (CN); Xiang Mi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/404,193

(22) Filed: Aug. 17, 2021

(65) Prior Publication Data
US 2021/0385788 A1 Dec. 9, 2021

Related U.S. Application Data

(63) Continuation of application No. PCT/CN2019/109526, filed on Sep. 30, 2019.

(30) Foreign Application Priority Data

Feb. 19, 2019 (WO) ................ PCT/CN2019/075499
Apr. 29, 2019 (WO) ................ PCT/CN2019/085052

(51) Int. Cl.
*H04W 68/00* (2009.01)
*H04L 1/00* (2006.01)
*H04L 5/00* (2006.01)

(52) U.S. Cl.
CPC ......... *H04W 68/005* (2013.01); *H04L 1/0051* (2013.01); *H04L 5/0082* (2013.01); *H04L 5/0092* (2013.01)

(58) Field of Classification Search
CPC ... H04L 1/0051; H04L 5/0082; H04L 5/0092; H04W 68/005; H04W 68/02; H04W 76/28; Y02D 30/70
See application file for complete search history.

(56) References Cited

U.S. PATENT DOCUMENTS

| | | | |
|---|---|---|---|
| 8,964,672 B2* | 2/2015 | Suzuki | H04W 68/025 370/329 |
| 2010/0248752 A1* | 9/2010 | Yu | H04W 72/23 455/458 |

(Continued)

FOREIGN PATENT DOCUMENTS

| | | |
|---|---|---|
| CN | 102036381 A | 4/2011 |
| CN | 104735691 A | 6/2015 |

(Continued)

OTHER PUBLICATIONS

ZTE, Presence of NRS on non-anchor PRB, 3GPP TSG RAN WG1 #95 R1-1812778, 3GPP, Nov. 12-16, 2018, 4 pages.

(Continued)

*Primary Examiner* — Liton Miah
(74) *Attorney, Agent, or Firm* — Maier & Maier, PLLC

(57) ABSTRACT

Embodiments provide a reference signal receiving and sending method. The solution is used in a plurality of cycles including a first cycle and a second cycle which each includes M first durations, and the first duration includes N paging occasions. The solution includes: determining a first target paging occasion that is in an $m^{th}$ first duration of the first cycle, where a relative location of the first target paging occasion in the first cycle is different from a relative location of a second target paging occasion in the second cycle, and the second target paging occasion is a target paging occasion in an $m^{th}$ first duration of the second cycle; determining, based on the first target paging occasion, a time domain resource that is in the $m^{th}$ first duration of the first cycle; and receiving or sending the reference signal on the time-frequency resource.

20 Claims, 13 Drawing Sheets

(56) References Cited

U.S. PATENT DOCUMENTS

| | | | |
|---|---|---|---|
| 2013/0229965 | A1 | 9/2013 | Bressanelli et al. |
| 2020/0178203 | A1* | 6/2020 | Lee ..................... H04W 68/005 |
| 2020/0221508 | A1* | 7/2020 | Huang ................ H04W 68/005 |
| 2021/0153162 | A1* | 5/2021 | Chen ................. H04W 72/0453 |
| 2021/0250899 | A1* | 8/2021 | Liu ....................... H04W 16/14 |
| 2021/0360532 | A1* | 11/2021 | Jiang ................ H04W 52/0229 |

FOREIGN PATENT DOCUMENTS

| | | |
|---|---|---|
| CN | 104813722 A | 7/2015 |
| CN | 108141839 A | 6/2018 |
| CN | 108282861 A | 7/2018 |
| CN | 108702707 A | 10/2018 |
| CN | 108702721 A | 10/2018 |
| CN | 109120388 A | 1/2019 |
| CN | 109309555 A | 2/2019 |
| WO | 2018034762 A1 | 2/2018 |
| WO | 2018127025 A1 | 7/2018 |
| WO | 2018141262 A1 | 8/2018 |
| WO | 2018204849 A1 | 11/2018 |
| WO | 2019019960 A1 | 1/2019 |
| WO | 2019027242 A1 | 2/2019 |

OTHER PUBLICATIONS

Huawei et al: "NRS presence on non-anchor carriers for paging", 3GPP TSG RAN WG1 Meeting #97; R1-1905976, May 13, 2019, XP051727433, total 6 pages.

Huawei et al. "NRS presence on non-anchor carriers for paging." 3GPP TSG RAN WG1 Meeting #95, R1-1812138, Spokane, USA. Nov. 12-16, 2018. 4 pages.

3GPP. "3rd Generation Partnership Project; Technical Specification Group Radio Access Network; Evolved Universal Terrestrial Radio Access (E-UTRA); Physical channels and modulation (Release 15)." 3GPP TS 36.211 V15.4.0 (Dec. 2018). 240 pages.

3GPP. "3rd Generation Partnership Project; Technical Specification Group Radio Access Network; Evolved Universal Terrestrial Radio Access (E-UTRA); Physical layer procedures (Release 15)." 3GPP TS 36.213 V15.4.0 (Dec. 2018). 550 pages.

3GPP. "3rd Generation Partnership Project; Technical Specification Group Radio Access Network; Evolved Universal Terrestrial Radio Access (E-UTRA); User Equipment (UE) procedures in idle mode (Release 15)." 3GPP TS 36.304 V15.2.0 (Dec. 2018). 55 pages.

3GPP. "3rd Generation Partnership Project; Technical Specification Group Radio Access Network; Evolved Universal Terrestrial Radio Access (E-UTRA); Radio Resource Control (RRC); Protocol specification (Release 14)." 3GPP TS 36.331 V14.9.0 (Dec. 2018). 773 pages.

Mediatek Inc. NRS presence on non-anchor carrier in NB-IoT.3GPP TSG RAN WG1 Meeting #98, R1-1908749, Prague, Czech Republic. Aug. 26-30, 2019. 6 pages.

Huawei et al. "NRS presence on non-anchor carriers for paging." 3GPP TSG RAN WG1 Meeting #98, R1-1908091, Prague, Czech Republic. Aug. 26-30, 2019. 6 pages.

Ericsson. "Presence of NRS on a non-anchor carrier for paging in NB-IoT." 3GPP TSG-RAN WG1 Meeting #98, R1-1908032, Prague, Czech Republic. Aug. 26-30, 2019. 10 pages.

Huawei et al. "NRS presence on non-anchor carriers for paging." 3GPP TSG RAN WG1 Meeting #97, R1-1905976, Reno, USA. May 13-17, 2019. 6 pages.

Huawei et al. "NRS presence on non-anchor carriers for paging." 3GPP TSG RAN WG1 Meeting #96, R1-1901507, Athens, Greece. Feb. 25-Mar. 1, 2019. 10 pages.

* cited by examiner

REFERENCE SIGNAL RECEIVING AND SENDING METHOD, DEVICE, AND SYSTEM

CROSS-REFERENCE TO RELATED APPLICATIONS

This application is a continuation of International Application No. PCT/CN2019/109526, filed on Sep. 30, 2019, which claims priority to International Application No. PCT/CN2019/085052, filed on Apr. 29, 2019, and International Application No. PCT/CN2019/075499, filed on Feb. 19, 2019. All of the aforementioned patent applications are hereby incorporated by reference in their entireties.

TECHNICAL FIELD

The embodiments relate to the field of communications, and in particular, to a reference signal receiving and sending method, a device, and a system.

BACKGROUND

In a wireless communication system, a terminal device has two modes. One is a connected mode, indicating that the terminal device has established a connection to a network device and can directly communicate with the network device. The other is an idle mode or referred to as a sleep mode, indicating that the terminal device cannot directly communicate with the network device. When there is no service data to be sent or received, the terminal device may enter the idle mode to reduce power consumption. When the network device needs to send service data to the terminal device or needs the terminal device to report some service data, the network device may notify the terminal device by using a paging mechanism. The terminal device in idle mode periodically wakes up to monitor a physical downlink control channel (PDCCH) and detects whether a paging scheduling message exists on the PDCCH. If the paging scheduling message exists, and paging scheduling is performed for the terminal device, the terminal device switches from the idle mode to the connected mode, to send or receive service data. A location at which the terminal device wakes up is referred to as a paging occasion (PO).

However, in the current internet of things, there are many types of services that are actively reported, that is, an uplink is mainly used, and a paging probability is relatively low. Therefore, the network device does not send a corresponding paging scheduling message in most PDCCH search spaces in which a subframe corresponding to a PO is used as a start subframe, but the terminal device still needs to start to listen to the PDCCH from each PO corresponding to the terminal device. In a PDCCH search space in which a subframe corresponding to each PO is used as a start subframe, the terminal device determines, only after blindly detecting all candidate locations starting from the first candidate location in the PDCCH search space, that there is no paging scheduling message. This is a waste of power of the terminal device.

Based on this, in the current technology, to enable a terminal device that is easily covered to terminate PDCCH detection in advance, the network device may send some narrowband reference signals (NRS) to the terminal device on a non-anchor (non-anchor) carrier. Considering that excessive NRSs increase NRS overheads, the NRSs sent by the network device to the terminal device may be NRSs associated with a PO subset. For example, the PO subset may include, for example, an $m^{th}$ PO in every N POs, where m is a positive integer less than or equal to N, and N is a positive integer. However, because locations of POs on which different terminal devices perform monitoring may be different, this solution has a problem of unfairness to terminal devices that perform monitoring on different POs.

SUMMARY

Embodiments provide a reference signal receiving and sending method, a device, and a system to resolve a problem that an existing solution is unfair to terminal devices that perform monitoring on different POs.

To achieve the foregoing objective, the following solutions are used in the embodiments.

According to a first aspect, a reference signal sending method and a corresponding communication apparatus are provided. The solution is used in a plurality of cycles whose cycle lengths are a first cycle length, the plurality of cycles include a first cycle and a second cycle, the first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1. The solution includes: determining, by a network device, a first target paging occasion that is in an $m^{th}$ first duration of the first cycle, where a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M; determining, by the network device based on the first target paging occasion, a time domain resource that is in the $m^{th}$ first duration of the first cycle, where the time domain resource is a time domain resource of a time-frequency resource used to transmit a reference signal; and sending, by the network device, the reference signal to the terminal device on the time-frequency resource. In other words, in this solution, on a non-anchor carrier, the reference signal is still sent when there is no paging scheduling message on an NPDCCH, and the relative location, in the first cycle, of the first target paging occasion that is in the $m^{th}$ first duration of the first cycle associated with the reference signal is different from the relative location, in the second cycle, of the second target paging occasion that is in the $m^{th}$ first duration of the second cycle. From a perspective of the terminal device, because one paging occasion is monitored in each discontinuous reception cycle, locations of paging occasions monitored by different terminal devices may be different. Therefore, according to this solution, when paging occasions monitored by different terminal devices are different, in a plurality of different discontinuous reception cycles, the paging occasions monitored by the different terminal devices each have an opportunity to be associated with a reference signal in one of the discontinuous reception cycles, and a case in which paging occasions monitored by some terminal devices do not have an associated reference signal is avoided. Therefore, this solution is fairer to a plurality of terminal devices.

In a possible implementation, the solution further includes: determining, by the network device, that the first duration includes the N paging occasions, where a value of N is related to a paging configuration parameter, and the paging configuration parameter includes at least one of a quantity of paging occasions in a discontinuous reception cycle or a length of the discontinuous reception cycle.

In a possible implementation, the determining, by a network device, a first target paging occasion that is in an $m^{th}$ first duration of the first cycle includes: determining, by the network device, a first offset, where the first offset is used to indicate a location of the first target paging occasion in N paging occasions in the $m^{th}$ first duration of the first cycle; and determining, by the network device based on the first offset, the first target paging occasion that is in the $m^{th}$ first duration of the first cycle. According to this solution, the network device may determine the first target paging occasion that is in the $m^{th}$ first duration of the first cycle.

In a possible implementation, the determining, by the network device based on the first offset, the first target paging occasion that is in the $m^{th}$ first duration of the first cycle includes: if there are a plurality of first target paging occasions, determining, by the network device based on the first offset, the first one of the first target paging occasions that are in the $m^{th}$ first duration of the first cycle. According to this solution, when there are a plurality of first target paging occasions, the network device may determine the first one of the first target paging occasions that are in the $m^{th}$ first duration of the first cycle, so that the network device can learn of all of the first target paging occasions.

In a possible implementation, the solution further includes: sending, by the network device, an N-bit bitmap to the terminal device, where each bit in the bitmap is used to indicate whether each of the N paging occasions is associated with the reference signal; and the determining, by the network device based on the first offset, the first target paging occasion that is in the $m^{th}$ first duration of the first cycle includes: determining, by the network device based on the bitmap and the first offset, the first target paging occasion that is in the $m^{th}$ first duration of the first cycle. According to this solution, the network device may determine the first target paging occasion that is in the $m^{th}$ first duration of the first cycle.

In a possible implementation, the determining, by the network device based on the first offset, the first target paging occasion that is in the $m^{th}$ first duration of the first cycle includes: determining, by the network device, an index (which may be represented by PO_Index) of a paging occasion that is in the $m^{th}$ first duration of the first cycle, where the index of the paging occasion in the $m^{th}$ first duration of the first cycle is an index, in the first cycle or a reference signal cycle, of the paging occasion in the $m^{th}$ first duration of the first cycle; determining, by the network device in the index of the paging occasion in the $m^{th}$ first duration of the first cycle, an index (PO_Index1) of the first target paging occasion that is in the $m^{th}$ first duration of the first cycle based on the first offset; and determining, by the network device, the first target paging occasion based on the index of the first target paging occasion. According to this solution, the network device may determine the first target paging occasion that is in the $m^{th}$ first duration of the first cycle.

In a possible implementation, the determining, by a network device, a first target paging occasion that is in an $m^{th}$ first duration of the first cycle may include: determining, by the network device, a second parameter value based on R, PO_Index, and N, where the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs. According to this solution, the network device may determine the first target paging occasion that is in the $m^{th}$ first duration of the first cycle.

According to a second aspect, a reference signal receiving method and a corresponding communication apparatus are provided. The solution is used in a plurality of cycles whose cycle lengths are a first cycle length, the plurality of cycles include a first cycle and a second cycle, the first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1. The solution includes: determining, by a terminal device, a first target paging occasion that is in an $m^{th}$ first duration of the first cycle, where a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M; determining, by the terminal device based on the first target paging occasion, a time domain resource that is in the $m^{th}$ first duration of the first cycle, where the time domain resource is a time domain resource of a time-frequency resource used to transmit a reference signal; and receiving, by the terminal device on the time-frequency resource, the reference signal that is from a network device. For effects brought by the second aspect, refer to the effects brought by the first aspect. Details are not described herein again.

In a possible implementation, the solution further includes: determining, by the terminal device, that the first duration includes the N paging occasions, where a value of N is related to a paging configuration parameter, and the paging configuration parameter includes at least one of a quantity of paging occasions in a discontinuous reception cycle or a length of the discontinuous reception cycle.

In a possible implementation, the determining, by a terminal device, a first target paging occasion that is in an $m^{th}$ first duration of the first cycle includes: determining, by the terminal device, a first offset, where the first offset is used to indicate a location of the first target paging occasion in N paging occasions in the $m^{th}$ first duration of the first cycle; and determining, by the terminal device based on the first offset, the first target paging occasion that is in the $m^{th}$ first duration of the first cycle.

In a possible implementation, the determining, by the terminal device based on the first offset, the first target paging occasion that is in the $m^{th}$ first duration of the first cycle includes: if there are a plurality of first target paging occasions, determining, by the terminal device based on the first offset, the first one of the first target paging occasions that are in the $m^{th}$ first duration of the first cycle.

In a possible implementation, the solution further includes: receiving, by the terminal device, an N-bit bitmap from the network device, where each bit in the bitmap is used to indicate whether each of the N paging occasions is associated with the reference signal; and the determining, by the terminal device based on the first offset, the first target paging occasion that is in the $m^{th}$ first duration of the first cycle includes: determining, by the terminal device based on the bitmap and the first offset, the first target paging occasion that is in the $m^{th}$ first duration of the first cycle.

In a possible implementation, the determining, by the terminal device based on the first offset, the first target paging occasion that is in the $m^{th}$ first duration of the first cycle includes: determining, by the terminal device, an index (which may be represented by PO_Index) of a paging occasion that is in the $m^{th}$ first duration of the first cycle, where the index of the paging occasion in the $m^{th}$ first duration of the first cycle is an index, in the first cycle or a reference signal cycle, of the paging occasion in the $m^{th}$ first duration of the first cycle; determining, by the terminal device in the index of the paging occasion in the $m^{th}$ first duration of the first cycle, an index (PO_Index1) of the first target paging occasion that is in the $m^{th}$ first duration of the first cycle based on the first offset; and determining, by the terminal device, the first target paging occasion based on the index of the first target paging occasion. According to this solution, the terminal device may determine the first target paging occasion that is in the $m^{th}$ first duration of the first cycle.

In a possible implementation, the determining, by a terminal device, a first target paging occasion that is in an $m^{th}$ first duration of the first cycle may include: determining, by the terminal device, a second parameter value based on R, PO_Index, and N, where the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs. According to this solution, the terminal device may determine the first target paging occasion that is in the $m^{th}$ first duration of the first cycle.

For effects brought by any implementation of the second aspect, refer to the effects brought by different implementations of the first aspect. Details are not described herein again.

With reference to the first aspect or the second aspect, in a possible implementation, the first offset is determined based on a first parameter value, the first cycle length, and N; and the first parameter value is determined based on one or both of a sequence number of a frame from which the first cycle starts or a sequence number of a hyper frame to which the first cycle belongs; or the first parameter value is determined based on a cycle length of the reference signal and one or both of a sequence number of a frame from which the first cycle starts or a sequence number of a hyper frame to which the first cycle belongs.

For example, the first offset, the first parameter value, the first cycle length, and N may satisfy: First offset=(First parameter value/First cycle length) mod N, where mod represents a modulo operation.

With reference to the first aspect or the second aspect, in a possible implementation, the first offset is determined based on a first parameter value and N; and the first parameter value is determined based on a cycle length of the reference signal, the first cycle length, and one or both of a sequence number of a frame from which the first cycle starts or a sequence number of a hyper frame to which the first cycle belongs.

For example, the first offset, the first parameter value, and N may satisfy: First offset=(First parameter value) mod N, where mod represents a modulo operation.

Optionally, that the first offset is determined based on a first parameter value and N includes: the first offset is determined based on the first parameter value, N, and a pseudo-random sequence.

For example, the first offset, the first parameter value, the pseudo-random sequence, and N may satisfy: First offset=f (Pseudo-random sequence) mod N, where mod represents a modulo operation, the pseudo-random sequence is a pseudo-random sequence related to the first parameter value, and f(pseudo-random sequence) is a function determined by the pseudo-random sequence.

With reference to the first aspect or the second aspect, in a possible implementation, the second parameter value may satisfy a formula: Second parameter value=(A1+ B1*PO_Index+C1*R) mod N, where A1, B1, and C1 are all integers.

With reference to the first aspect or the second aspect, in a possible implementation, R may satisfy a formula: R=floor $((SFN_1+1024*H\text{-}SFN_1)/T)$, where $SFN_1$ represents the sequence number of the frame to which the paging occasion in the $m^{th}$ first duration of the first cycle belongs or the sequence number of the frame from which the first cycle starts, $H\text{-}SFN_1$ represents the sequence number of the hyper frame to which the paging occasion in the $m^{th}$ first duration of the first cycle belongs or the sequence number of the hyper frame to which the first cycle belongs, floor represents rounding down, and T represents the first cycle.

With reference to the first aspect or the second aspect, in a possible implementation, PO_Index may satisfy a formula: PO_Index=$(A+(floor((B+SFN_1)*nB/T+C)+i\_s)$ mod $(nB)$, where floor represents rounding down, $SFN_1$ represents the sequence number of the frame to which the paging occasion in the $m^{th}$ first duration of the first cycle belongs or the sequence number of the frame from which the first cycle starts, T represents the first cycle, A, B, and C are all integers, mod represents a modulo operation, nB represents a paging density, and i_s represents an index of a sequence number of a subframe to which the paging occasion in the $m^{th}$ first duration of the first cycle belongs.

With reference to the first aspect or the second aspect, PO_Index1 may satisfy a formula: (PO_Index1) mod N=First offset. N is a quantity of paging occasions in the $m^{th}$ first duration of the first cycle.

With reference to the first aspect or the second aspect, in a possible implementation, both the first cycle and the second cycle are discontinuous reception cycles.

According to a third aspect, a communication apparatus is provided, to implement the foregoing methods. The communication apparatus may be the terminal device in the second aspect, the following eleventh aspect, or the following thirteenth aspect, or an apparatus including the terminal device. Alternatively, the communication apparatus may be the network device in the first aspect, the following tenth aspect, or the following twelfth aspect, or an apparatus including the network device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a fourth aspect, a communication apparatus is provided. The apparatus includes a processor and a memory. The memory is configured to store computer instructions; and when the processor executes the instructions, the communication apparatus performs the method according to either of the foregoing aspects. The communication apparatus may be the terminal device in the second aspect, the following eleventh aspect, or the following thirteenth aspect, or an apparatus including the terminal device. Alternatively, the communication apparatus may be the network device in the first aspect, the following tenth aspect, or the following twelfth aspect, or an apparatus including the network device.

According to a fifth aspect, a communication apparatus is provided, and includes a processor. The processor is configured to: be coupled to a memory; and after reading instructions in the memory, perform, according to the instructions, the method according to either of the foregoing aspects. The communication apparatus may be the terminal device in the second aspect, the following eleventh aspect, or the following thirteenth aspect, or an apparatus including the terminal device. Alternatively, the communication apparatus may be the network device in the first aspect, the following tenth aspect, or the following twelfth aspect, or an apparatus including the network device.

According to a sixth aspect, a computer-readable storage medium is provided. The computer-readable storage medium stores instructions. When the instructions are run on a computer, the computer is enabled to perform the method according to any one of the foregoing or following aspects.

According to a seventh aspect, a computer program product including instructions is provided. When the computer program product runs on a computer, the computer is enabled to perform the method according to any one of the foregoing or following aspects.

According to an eighth aspect, a communication apparatus (for example, the communication apparatus may be a chip or a chip system) is provided. The communication apparatus includes a processor, configured to implement the function according to any one of the foregoing or following aspects. In a possible implementation, the communication apparatus further includes a memory. The memory is configured to store necessary program instructions and necessary data. When the communication apparatus is a chip system, the communication apparatus may include a chip, or may include a chip and another discrete component.

For effects brought by any implementation of the third aspect to the eighth aspect, refer to effects brought by different implementations of the first aspect, the second aspect, or the following tenth or thirteenth aspect. Details are not described herein again.

According to a ninth aspect, a communication system is provided. The communication system includes the terminal device in the foregoing aspect and the network device in the foregoing aspect. Alternatively, the communication system includes a terminal device described in the following aspects and a network device described in the following aspects.

According to a tenth aspect, a reference signal sending method and a corresponding communication apparatus are provided, and the method includes: sending, by a network device, first indication information to a terminal device, where the first indication information is used to indicate whether a first reference signal exists on a first resource; and if the first indication information indicates that the first reference signal does not exist on the first resource, sending, by the network device, second indication information to the terminal device, where the second indication information is used to indicate whether a second reference signal exists on the first resource. For example, the first reference signal herein may be, for example, a narrowband reference signal (NRS), and the second reference signal herein may be, for example, a cell-specific reference signal (CRS). In other words, in this embodiment, when the network device needs to send both the first reference signal and the second reference signal in an in-band same-PCI case, because the first reference signal is configured, the second reference signal is definitely configured. Therefore, the indication information used to indicate the first reference signal may be used to indicate the two reference signals. That is, the network device may indicate, by using the first indication information, that the first reference signal and the second reference signal exist on the first resource. Alternatively, the network device may indicate, by using the first indication information used to indicate the first reference signal and the second indication information used to indicate the second reference signal, that neither the first reference signal nor the second reference signal exists on the first resource, or that only the second reference signal exists on the first resource. According to this solution, the first reference signal and the second reference signal can be flexibly configured. For example, if the first reference signal is an NRS, and the second reference signal is a CRS, in the in-band same-PCI case, the network device may send only the CRS on the first resource, thereby avoiding various problems such as a waste of power of the network device, impact on LTE resource scheduling, and a disadvantage of power shutdown of the network device for a symbol-level resource and that are in the current technology and that are caused by additionally sending the CRS on some resources and additionally sending the NRS on these resources.

According to an eleventh aspect, a reference signal receiving method and a corresponding communication apparatus are provided, and the method includes: receiving, by a terminal device, first indication information from a network device, where the first indication information is used to indicate whether a first reference signal exists on a first resource; and if the first indication information indicates that the first reference signal does not exist on the first resource, receiving, by the terminal device, second indication information from the network device, where the second indication information is used to indicate whether a second reference signal exists on the first resource. For example, the first reference signal herein may be, for example, a narrowband reference signal, and the second reference signal herein may be, for example, a cell-specific reference signal. For effects of the eleventh aspect, refer to the effect of the tenth aspect. Details are not described herein again.

According to a twelfth aspect, a reference signal sending method and a corresponding communication apparatus are provided, and the method includes: sending, by a network device, first indication information to a terminal device, where the first indication information is used to indicate whether a first reference signal exists on a first resource; and if the first indication information indicates that the reference signal exists on the first resource, sending, by the network device, second indication information to the terminal device, where the second indication information is used to indicate whether a first reference signal exists on the first resource. For example, the first reference signal herein may be, for example, a (narrowband reference signal) NRS. In other words, in this embodiment, when the network device does not need to send a reference signal in an in-band same-PCI case, the network device may indicate, by using the first indication information, that no reference signal exists on the first resource. Alternatively, when the network device needs to send both the first reference signal and the second reference signal in an in-band same-PCI case, because the first reference signal is configured, the second reference signal is definitely configured. Therefore, the indication information used to indicate the first reference signal may be used to indicate the two reference signals. That is, the network device may indicate, by using the first indication information and the second indication information, that the first reference signal and the second reference signal exist on the first resource. Alternatively, when the network device does not need to send the first reference signal but needs to send the second reference signal in an in-band same-PCI case, if the second indication information indicates that the first reference signal does not exist on the first resource, that is, indicates that only the second reference signal exists on the first resource, the first indication information and the second indication information may be used to indicate that only the second reference signal exists on the first resource. According to this solution, the first reference signal and the second reference signal can be flexibly configured. For example, if the first reference signal is an NRS, and the second reference signal is a CRS, in the in-band same-PCI case, the network device may send only the CRS on the first resource, thereby avoiding various problems such as a waste of power of the network device, impact on LTE resource scheduling, and a disadvantage of power shutdown of the network device for a symbol-level resource and that are in the current technology and that are caused by additionally sending the CRS on some resources and additionally sending the NRS on these resources.

According to a thirteenth aspect, a reference signal receiving method and a corresponding communication apparatus are provided, and the method includes: receiving, by a terminal device, first indication information from a network device, where the first indication information is used to indicate whether a reference signal exists on a first resource; and if the first indication information indicates that the reference signal exists on the first resource, receiving, by the terminal device, second indication information from the network device, where the second indication information is used to indicate whether a first reference signal exists on the first resource. For example, the first reference signal herein may be, for example, a narrowband reference signal (NRS). For effects of the thirteenth aspect, refer to the effect of the twelfth aspect. Details are not described herein again.

With reference to any one of the tenth aspect to the thirteenth aspect, in a possible implementation, the first indication information and the second indication information are carrier-level indication information.

With reference to any one of the tenth aspect to the thirteenth aspect, in a possible implementation, the first indication information and the second indication information are cell-level indication information.

With reference to any one of the tenth aspect to the thirteenth aspect, in a possible implementation, the first indication information is cell-level indication information, and the second indication information is carrier-level indication information.

With reference to any one of the tenth aspect to the thirteenth aspect, in a possible implementation, the first indication information is carrier-level indication information, and the second indication information is cell-level indication information.

DETAILED DESCRIPTION OF THE EMBODIMENTS

For ease of understanding of solutions in the embodiments, the following first briefly describes technologies related to the embodiments.

First: PO

When a terminal device is in idle mode, a network device notifies, by using a paging mechanism, the terminal device whether the terminal device needs to enter a connected mode to exchange information. In this case, the terminal device can complete a subsequent response only by monitoring a PDCCH. However, if the terminal device keeps monitoring the PDCCH in idle mode, a large amount of power of the terminal device is consumed. An idle discontinuous reception (DRX) working mechanism is fixed, and a fixed DRX cycle is used. To reduce power consumption, the network device and the terminal device negotiate with each other, and the terminal device blindly detects a PDCCH only in a PDCCH search space that uses a subframe (which may also be referred to as a PO location below) in which one PO in the DRX cycle is located as a start subframe. The PDCCH search space is a set of candidate locations at which target PDCCHs may appear. The PO location indicates a start location at which the terminal device monitors the PDCCH, to determine a start location of a PDCCH search space, and further blindly detect a PDCCH based on the start location of the PDCCH search space. In a PDCCH search space, one block may be considered as one candidate.

Figure 1A:
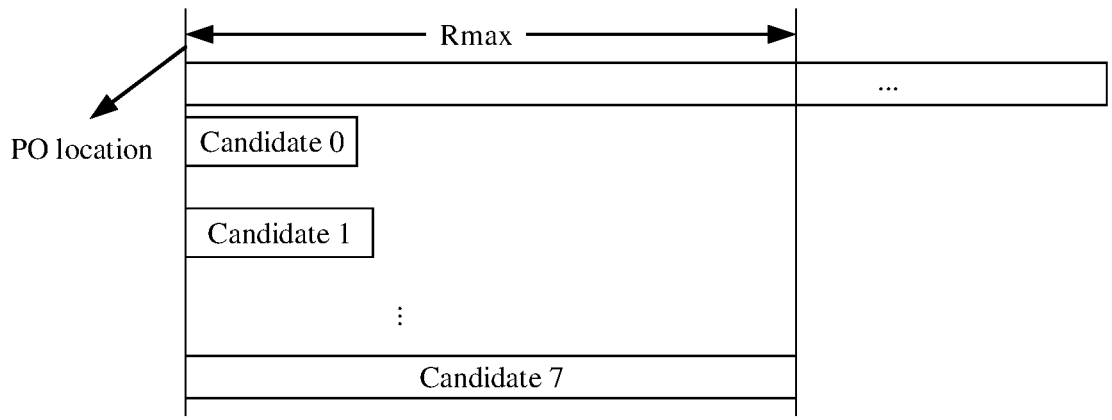
FIG. 1a is a schematic diagram of detection in an NPDCCH search space in an existing NB-IoT system.

It should be noted that the PDCCH in the embodiments may be a narrowband PDCCH (narrowband NPDCCH) in the narrowband internet of things (NB-IoT), or may be another PDCCH. This is not limited in the embodiments. For example, as shown in FIG. 1a, in an NB-IoT system, there are a maximum of eight candidate locations in an NPDCCH search space, which are denoted as candidate 0, candidate 1, candidate 2, . . . , and candidate 7 respectively. In the embodiments, the candidate location occupies h subframes, where h is a quantity of NPDCCH repetitions at the candidate location, and h is a positive integer. This is uniformly described herein, and details are not further described below. In the current technology, a terminal device blindly detects different candidates in sequence in an NPDCCH search space that uses a subframe corresponding to a PO as a start subframe, until detection succeeds. If detection on none of the candidates succeeds, in a next DRX cycle, the terminal device continues to monitor an NPDCCH in an NPDCCH search space that uses a subframe corresponding to a PO as a start subframe, and so on. Rmax in FIG. 1a represents a length of an NPDCCH search space that uses a subframe corresponding to a PO as a start subframe, and may also be understood as a maximum quantity of NPDCCH repetitions. This is uniformly described herein, and details are not further described below.

The DRX cycle in the embodiments may be preconfigured on the terminal device or may be configured by the network device for the terminal device by using a system message. This is not limited in the embodiments. The DRX cycle may also be considered as a cycle in which the terminal device in idle mode periodically wakes up. This is uniformly described herein, and details are not further described below.

Figure 1B:
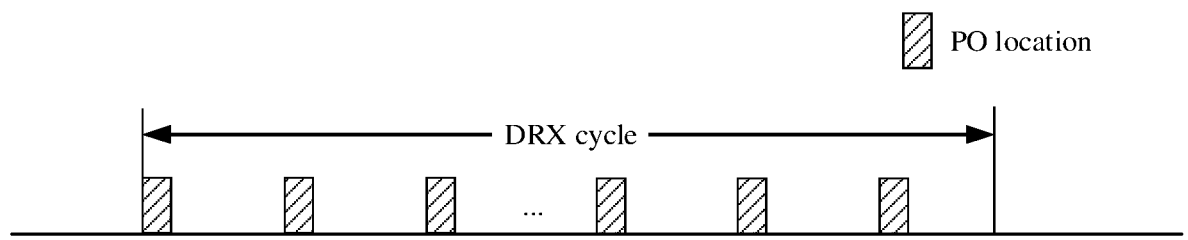
FIG. 1b is a schematic diagram of a PO location in a DRX cycle configured on an existing network device.

FIG. 1b is a schematic diagram of a PO location in a DRX cycle configured on a network device. It can be understood from FIG. 1b that, for the network device, a plurality of POs may be configured in one DRX cycle. However, for any one of a plurality of terminal devices that communicate with the network device, the terminal device wakes up only at one PO location in the DRX cycle. Therefore, if DRX is configured, the terminal device needs to accurately calculate when the terminal device needs to wake up in the DRX cycle, to monitor possible paging. The following provides a manner of determining a PO location at which a terminal device wakes up:

The PO location is determined jointly by using a system frame number (SFN) and a subframe number. In other words, the SFN and the subframe number may be used to identify the PO location, namely, a start location of an NPDCCH search space in which a paging scheduling message should appear. The SFN identifies a location of a system frame including the start location of the NPDCCH search space in which the paging scheduling message should appear, and the subframe number identifies a subframe location, in the system frame, of the start location of the NPDCCH search space in which the paging scheduling message should appear. One system frame includes 10 subframes, for example, subframe 0, subframe 1, subframe 2, subframe 3, . . . , subframe 8, and subframe 9. This is uniformly described herein, and details are not further described below.

In the embodiments, the terminal device may determine, based on a paging configuration parameter sent by the network device, an SFN and a subframe number that are corresponding to a PO. For example, an SFN that satisfies the following formula (a) may be used as an SFN corresponding to a PO:

$$\text{SFN mod } T = (T \text{ div } N1)*(UEID \text{ mod } N1) \quad \text{Formula (a)}$$

where mod represents a modulo operation; div represents division, that is, rounding; T represents a DRX cycle; a value of N1 is equal to min(T, nB), that is, the smaller value in T and nB, and a value range of N1 is {T, T/2, T/4, T/8, T/16, T/32, T/64, T/128, T/256, T/512, T/1024}; nB represents a paging density, that is, a quantity of POs in one DRX cycle, and a value range of nB is {4T, 2T, T, T/2, T/4, T/8, T/16, T/32, T/64, T/128, T/256, T/512, T/1024}; a value of UEID is equal to (international mobile subscriber identity (international mobile subscriber identity, IMSI) mod 4096), where an IMSI of each terminal device is unique.

For example, a subframe number corresponding to a PO may be determined by using the following formula (b):

$$i\_s = \text{floor}(UEID/N1) \bmod (Ns) \quad \text{Formula (b)}$$

where floor represents rounding down; Ns is equal to max(1, nB/T) and represents a quantity of POs in a system frame in which the PO exists, and a value range of Ns is (4, 2, 1); i_s represents an index of a subframe number, that is, a subframe number that corresponds to the PO and that may be obtained by looking up a table after i_s is calculated. For related descriptions of mod, N1, and UEID, refer to the foregoing formula (a). Details are not described herein again.

It can be understood from the formula (a) and the formula (b) that, once the parameters T, nB, and UEID are determined, the terminal device may determine a unique SFN in a DRX cycle according to the formula (a), and the terminal device may determine a unique subframe number in a system frame according to the foregoing formula (b), so that the terminal device can determine, in the DRX cycle based on the system frame number and the subframe number, a unique PO location at which the terminal device wakes up.

Similarly, for any one of the plurality of terminal devices that communicate with the network device, the network device may also determine, based on the formula (a) and the formula (b), a unique PO location at which the terminal device wakes up in one DRX cycle. Details are not described herein.

Figure 1C:
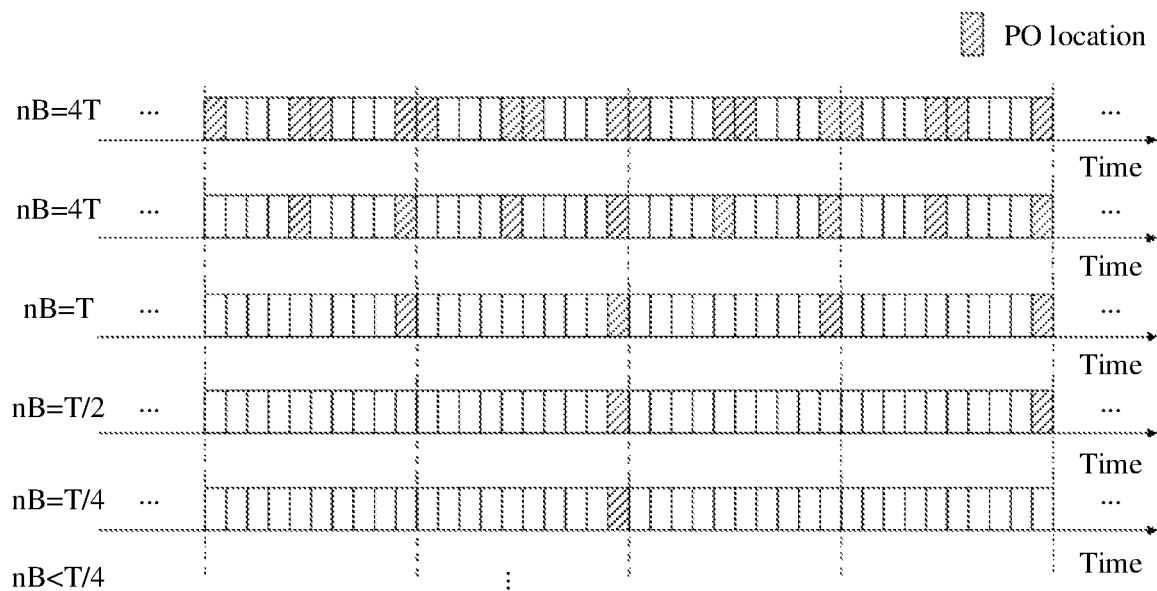
FIG. 1c is a schematic diagram of PO locations in DRX cycles that are configured on a network device and that correspond to different nB in an NB-IoT system in the current technology.

In addition, in the current technology, both the terminal device and the network device can determine, by using the parameters T, nB, and UEID, all PO locations configured by the network device in one DRX cycle. For example, as shown in FIG. 1c, an NB-IOT system is used as an example. nB=4T indicates that there are four POs in one system frame, and time domain resources of the four POs are separately subframe 0, subframe 4, subframe 5, and subframe 9. nB=2T indicates that there are two POs in one system frame, and time domain resources of the two POs are separately subframe 4 and subframe 9. nB=T indicates that there is one PO in one system frame, and a time domain resource of the PO is subframe 9. nB=T/2 indicates that there is one PO in two system frames, and a time domain resource of the PO is subframe 9 in one of the two system frames. In FIG. 1c, an example in which the time domain resource of the PO is subframe 9 of the second system frame or subframe 9 of the fourth system frame is used for description. nB=T/4 indicates that there is one PO in four system frames, and a time domain resource of the PO is subframe 9 in one of the four system frames. In FIG. 1c, an example in which the time domain resource of the PO is subframe 9 of the second system frame is used for description. The rest can be deduced by analogy.

In a current NB-IoT system, there are two types of carriers: an anchor (anchor) carrier and a non-anchor carrier. The anchor carrier carries a narrowband primary synchronization signal (NPSS), a narrowband secondary synchronization signal (NSSS), a narrowband physical broadcast channel (NPBCH), an NPDCCH, and a narrowband physical downlink shared channel (NPDSCH). The non-anchor carrier carries only an NPDCCH and an NPDSCH, and does not carry an NPSS, an NSSS, or an NPBCH. On the non-anchor carrier, when the terminal device calculates a PO location by using the formula (a) and the formula (b), the terminal device does not know whether there is a paging scheduling message in an NPDCCH search space that uses a subframe corresponding to a PO as a start subframe. Therefore, the terminal device needs to blindly detect an NPDCCH. When there is a paging scheduling message in the NPDCCH search space that uses the subframe corresponding to the PO as the start subframe, the network device sends an NRS at a candidate location at which the terminal device can detect the paging scheduling message, and sends the NRS at the candidate location at which the paging scheduling message is detected, in the first 10 subframes of the first subframe at the candidate location and in the last 4 subframes of the last subframe at the candidate location. When there is no paging scheduling message in the NPDCCH search space that uses the subframe corresponding to the PO as the start subframe, the network device does not send an NRS at the foregoing locations.

Therefore, in the current technology, when there is no paging scheduling message in the NPDCCH search space that uses the subframe corresponding to the PO as the start subframe, even if the terminal device is a terminal device with a good channel condition, the terminal device needs to blindly detect all candidate locations starting from the first candidate location in the PDCCH search space, and then can determine that there is no paging scheduling message. However, a terminal device with a good channel condition has a strong detection capability, and does not need to repeatedly detect an NPDCCH for so many times to learn whether there is a paging scheduling message. This causes a waste of power of the terminal device with the good channel condition.

In the embodiments, a terminal device with a good channel condition is a terminal device with some relatively good indicators, for example, relatively good reference signal received power (RSRP). This is uniformly described herein, and details are not further described below.

Second: Gold Sequence

The Gold sequence is a pseudo-random sequence. The following describes a method for generating the Gold sequence.

A manner of generating the Gold sequence c(n) is shown as the following formula (1):

$$c(n)=(x_1(n+N_C)+x_2(n+N_C)) \bmod 2 \quad \text{Formula (1)}$$

where a length of the Gold sequence is denoted as $M_{PN}$, that is, a value range of n is 0, 1, ..., $M_{PN}$−1, $x_1(n+N_C)$ and $x_2(n+N_C)$ are two sequences for generating c(n), $N_C$=1600, and mod ( ) indicates a modulo operation.

The foregoing sequence $x_1(n+N_C)$ may be determined by using the following formula (2):

$$x_1(n+31)=(x_1(n+3)+x_1(n)) \bmod 2 \quad \text{Formula (2)}$$

An initialization seed of the sequence $x_1(n+N_C)$ is $x_1(0)$=1, $x_1(n)$=0, n=1, 2, ..., 30.

The foregoing sequence $x_2(n+N_C)$ may be determined by using the following formula (3):

$$x_2(n+31)=(x_2(n+3)+x_2(n+2)+x_2(n+1)+x_2(n)) \bmod 2 \quad \text{Formula (3)}$$

Optionally, a value of the initialization seed of the sequence $x_2(n+N_C)$ is related to a specific application. For example, during generation of a demodulation reference signal (demodulation reference signal, DMRS) sequence, the initialization seed of the sequence $x_2(n+N_C)$ is 35. The sequence $x_2(n+N_C)$ may be obtained by using formulas $$c_{init} = \sum_{k=0}^{30} x_2(i) \cdot 2^i$$

and $C_{init}$=35.

Third: Hyper Frame (H-SFN)

Figure 1D:
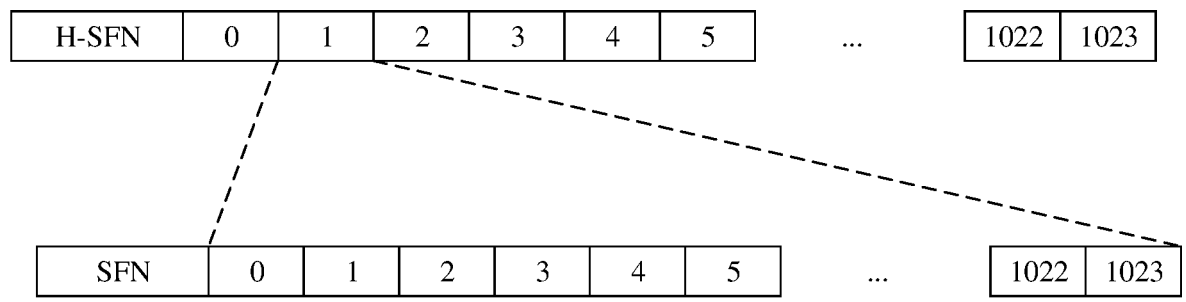
FIG. 1d is a schematic diagram of a relationship between an existing hyper frame and a system frame.

In legacy long term evolution (LTE), a time unit for synchronization between a terminal device and a network device is a system frame number (SFN). An SFN is 10 ms, and values of SFNs are from 0 to 1023. When an SFN reaches 1023, the SFNs restart from 0. That is, a maximum SFN cycle is 1024 SFNs=10240 ms=10.24 s. Therefore, in legacy LTE, lengths of some cycles (for example, a paging cycle and a connected DRX cycle) are smaller than 10.24 s. However, in the narrowband internet of things (narrow band internet of thing, NB-IoT), because 10.24 s cannot satisfy a requirement of a paging cycle, to save power, a concept of a hyper frame H-SFN is introduced. As shown in FIG. 1d, one H-SFN corresponds to 1024 SFNs, that is, one hyper frame is equal to 10.24 s, and a value of the H-SFN ranges from 0 to 1023. That is, a maximum H-SFN cycle is 1024 H-SFNs, and is corresponding to 2.9127 hours (hour).

The following describes the solutions in the embodiments with reference to the accompanying drawings in the embodiments. In the descriptions, "I" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions, "a plurality of" means two or more than two unless otherwise specified. "At least one item (piece) of the following" or a similar expression thereof represent any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the solutions in the embodiments, terms such as "first" and "second" are used in embodiments to distinguish between same items or similar items that have basically same functions and purposes. A person skilled in the art may understand that the terms such as "first" and "second" do not limit a quantity or an execution sequence, and that the terms such as "first" and "second" do not indicate a definite difference. In addition, in the embodiments, a word such as "example" or "for example" is used to represent giving an example, an illustration, or a description. Any embodiment or implementation scheme described as an "example" or with "for example" in the embodiments should not be explained as being preferable or having more advantages than another embodiment or implementation scheme. Exactly, use of the word such as "example" or "for example" is intended to present a relative concept in a specific manner for ease of understanding.

The embodiments are applicable to an LTE system, for example, an NB-IoT system, or are applicable to another wireless communication system, for example, a global system for mobile communication (GSM), a universal mobile telecommunications system (UMTS), a code division multiple access (CDMA) system, a wideband code division multiple access (WCDMA) system, and a future-oriented new network device system. This is not limited in the embodiments. The foregoing communication systems applicable to the embodiments are merely examples for description, and communication systems applicable to the embodiments are not limited thereto. A general description is provided herein, and details are not described below. In addition, the terms "system" and "network" may be interchanged.

Figure 1E:
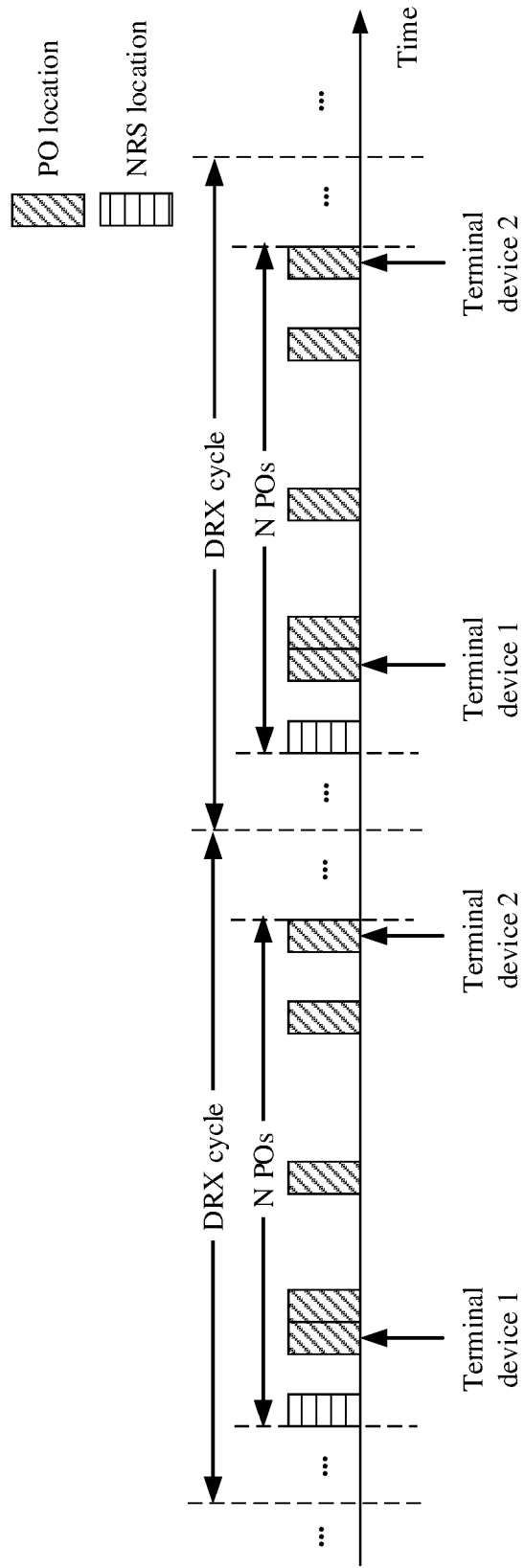
FIG. 1e is a schematic diagram showing that a subset of existing POs includes the first PO in every N POs.

In the current technology, to enable a terminal device that is easily covered to terminate PDCCH detection in advance, a network device may send some NRSs to the terminal device on a non-anchor carrier. Considering that excessive NRSs increase NRS overheads, the NRSs sent by the network device to the terminal device may be NRSs associated with a PO subset. As shown in FIG. 1e, each discontinuous reception (DRX) cycle may include a plurality of groups of N POs. Using any group of N POs as an example, assuming that a PO subset includes the first PO in every N POs, in one group of N POs in the first DRX cycle, only the first PO in the N POs is associated with an NRS subframe, and the other N−1 POs are not associated with any NRS subframe. It should be noted that FIG. 1e is merely an example in which one PO is associated with one NRS subframe. Further, one PO may be associated with a plurality of NRS subframes. This is not limited herein. A terminal device (for example, terminal device 1 or terminal device 2) monitoring each of the N POs estimates, by using an NRS subframe associated with the first PO, a signal to interference plus noise ratio (SINR) used to terminate an NPDCCH in advance. Similarly, in another DRX cycle, only the first PO in N POs is associated with an NRS subframe, and a terminal device (for example, terminal device 1 or terminal device 2) that monitors each of the N POs estimates, by using the NRS subframe associated with the first PO, an SINR used to terminate an NPDCCH in advance.

However, this solution has a problem of unfairness to terminal devices that monitor different POs. For example, in FIG. 1e, in each DRX cycle, because an NRS subframe is relatively close to a location of a PO monitored by terminal device 1, and is relatively far away from a location of a PO monitored by terminal device 2, terminal device 2 always needs to wake up earlier than terminal device 1 to measure an NRS. Consequently, power of terminal device 2 is wasted, and terminal device 2 may miss a paging scheduling message due to an inaccurate SINR. In other words, this solution is always unfair to terminal device 2.

Figure 2:
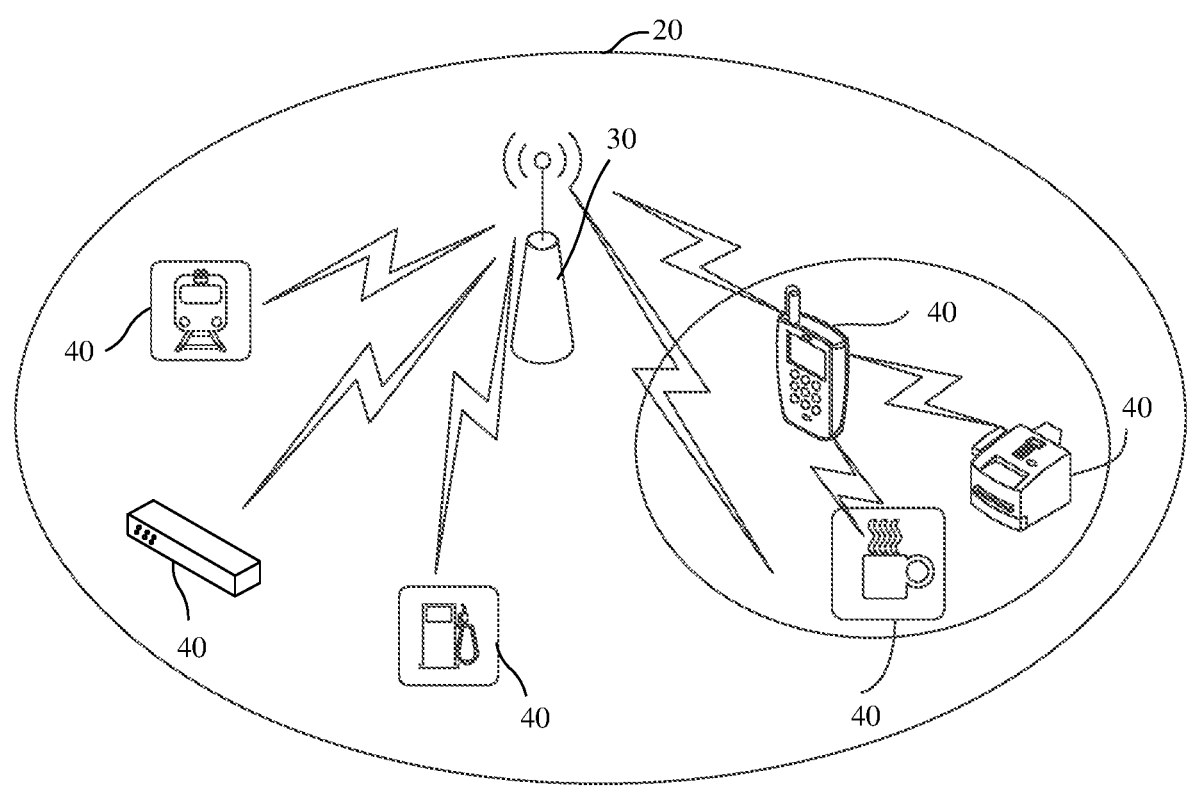
FIG. 2 is a schematic structural diagram of a communication system according to an embodiment.

Based on this, FIG. 2 shows a communication system 20 according to an embodiment. The communication system 20 includes a network device 30 and one or more terminal devices 40 connected to the network device 30. Optionally, different terminal devices in the plurality of terminal devices 40 may communicate with each other.

That the network device 30 interacts with any terminal device 40 is used as an example. This solution is used in a plurality of cycles whose cycle lengths are a first cycle length, and the plurality of cycles include a first cycle and a second cycle. The first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1. The network device 30 determines a first target paging occasion that is in an $m^{th}$ first duration of the first cycle, and the terminal device 40 determines the first target paging occasion that is in the $m^{th}$ first duration of the first cycle. A relative location of the first target paging occasion in the first cycle is different from a relative location of a second target paging occasion in the second cycle, and the second target paging occasion is a target paging occasion in an $m^{th}$ first duration of the second cycle, where m is any positive integer less than or equal to M. The network device 30 determines a time domain resource in the $m^{th}$ first duration of the first cycle based on the first target paging occasion, and the terminal device 40 determines the time domain resource in the $m^{th}$ first duration of the first cycle based on the first target paging occasion, where the time domain resource is a time domain resource of a time-frequency resource used to transmit a reference signal. Further, the network device 30 sends the reference signal to the terminal device 40 on the time-frequency resource, and the terminal device 40 receives the reference signal from the network device 30 on the time-frequency resource. A specific implementation of this solution is to be described in detail in subsequent method embodiments. Details are not further described herein. In the embodiments, on a non-anchor carrier, the reference signal is still sent when there is no paging scheduling message on an NPDCCH, and the relative location, in the first cycle, of the first target paging occasion that is in the $m^{th}$ first duration of the first cycle associated with the reference signal is different from the relative location, in the second cycle, of the second target paging occasion that is in the $m^{th}$ first duration of the second cycle. From a perspective of the terminal device, because one paging occasion is monitored in each discontinuous reception cycle, locations of paging occasions monitored by different terminal devices may be different. Therefore, according to this solution, when paging occasions monitored by different terminal devices are different, in a plurality of different discontinuous reception cycles, the paging occasions monitored by the different terminal devices each have an opportunity to be associated with a reference signal in one of the discontinuous reception cycles, and a case in which paging occasions monitored by some terminal devices do not have an associated reference signal is avoided. Therefore, this solution is fairer to a plurality of terminal devices.

Optionally, the network device 30 in this embodiment is a device for connecting the terminal device 40 to a wireless network, and may be an evolved NodeB (evolutional Node B, eNB, or eNodeB) in long term evolution (long term evolution, LTE), a base transceiver station (BTS) in GSM or CDMA, a NodeB (NodeB) in a WCDMA system, a base station in a fifth generation (5G) network or a future evolved public land mobile network (PLMN), a broadband network gateway (BNG), an aggregation switch, a non-3rd-generation partnership project (3GPP) access device, or the like. This is not limited in this embodiment. Optionally, the base station in this embodiment may include base stations in various forms, for example, a macro base station, a micro base station (which is also referred to as a small cell), a relay station, and an access point. This is not limited in this embodiment.

Optionally, the terminal device 40 in this embodiment may be a device, such as a terminal or a chip that may be used in the terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (virtual reality, VR) terminal device, an augmented reality (AR) terminal device, a wireless terminal in industrial control, a wireless terminal in self driving, a wireless terminal in remote medical, a wireless terminal in a smart grid a wireless terminal in transportation safety, a wireless terminal in a smart city, a wireless terminal in a smart home, or the like. The terminal may be mobile or in a fixed location.

Optionally, the network device 30 and the terminal device 40 in this embodiment may also be referred to as communication apparatuses, and each may be a general-purpose device or a dedicated device. This is not limited in this embodiment.

Figure 3:
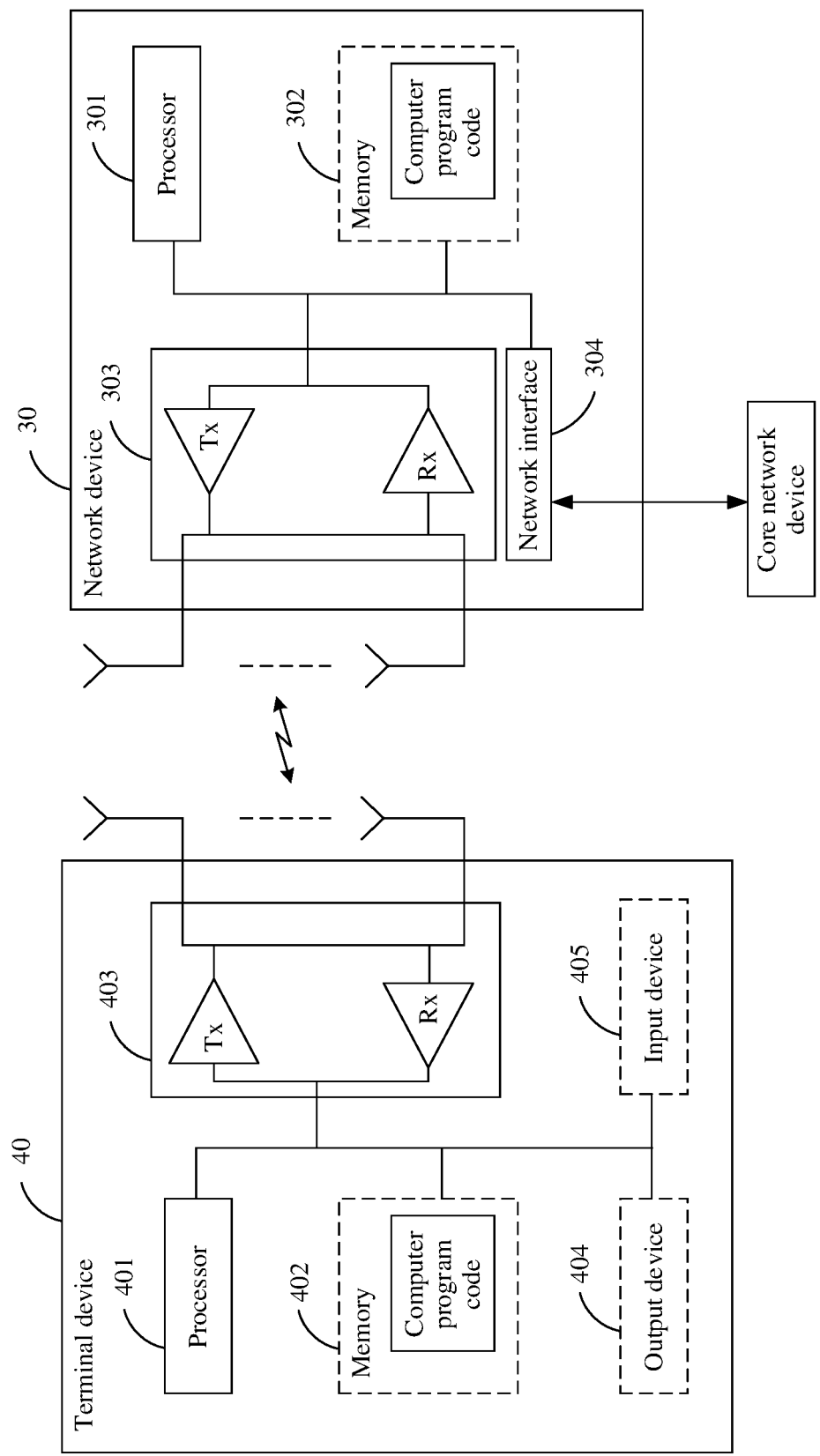
FIG. 3 is a schematic structural diagram of a terminal device and a network device according to an embodiment.

Optionally, FIG. 3 is a schematic structural diagram of the network device 30 and the terminal device 40 according to this embodiment.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). Optionally, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected by using a communication line. The communication line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in the embodiments. In a specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, and/or processing cores configured to process data (for example, computer program instructions).

The memory 402 may be an apparatus having a storage function. For example, the memory 402 may be a read-only memory (read-only memory, ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a blu-ray optical disc, or the like), a magnetic disk storage medium or another magnetic storage device, or any other computer-accessible medium that can be used to carry or store desired program code in an instruction or data structure form, but is not limited thereto. The memory 402 may exist independently, and is connected to the processor 401 by using the communication line. Alternatively, the memory 402 may be integrated with the processor 401.

The memory 402 is configured to store computer-executable instructions for performing the solutions in the embodiments, and the processor 401 controls execution of the computer-executable instructions. For example, the processor 401 is configured to execute the computer-executable instructions stored in the memory 402, to implement the reference signal receiving method in the embodiments.

Alternatively, optionally, in this embodiment, the processor 401 may perform processing related functions in the reference signal receiving method provided in the following embodiments, and the transceiver 403 is responsible for communication with another device or a communication network. This is not limited in this embodiment.

Optionally, the computer-executable instructions in this embodiment may also be referred to as application program code or computer program code. This is not limited in this embodiment.

The transceiver 403 may use any apparatus such as a transceiver, and is configured to communicate with another device or a communication network such as an Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). Optionally, the network device 30 may further include at least one memory (an example in which the network device 30 includes one memory 302 is used for description in FIG. 3). The processor 301, the memory 302, the transceiver 303, and the network interface 304 are connected by using a communication line. The network interface 304 is configured to connect to a core network device through a link (for example, an S1 interface), or connect to a network interface of another network device through a wired or wireless link (for example, an X2 interface) (not shown in FIG. 3). This is not limited in this embodiment. In addition, for descriptions about the processor 301, the memory 302, and the transceiver 303, refer to descriptions about the processor 401, the memory 402, and the transceiver 403 in the terminal device 40. Details are not described again herein.

Figure 4:
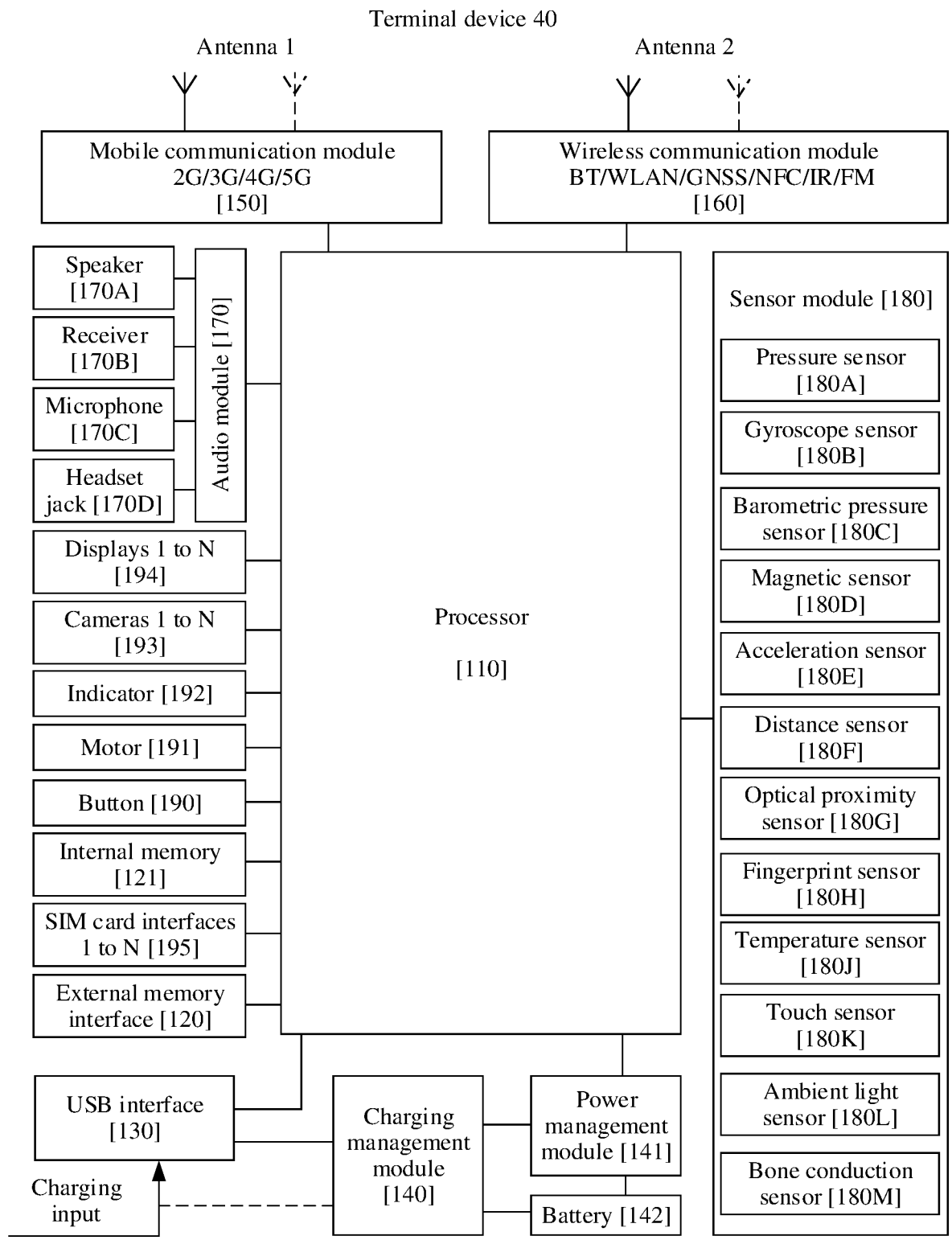
FIG. 4 is another schematic structural diagram of a terminal device according to an embodiment.

With reference to the schematic structural diagram of the terminal device 40 shown in FIG. 3, for example, FIG. 4 is a specific structural form of the terminal device 40 according to an embodiment.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution used for wireless communication that includes 2G, 3G, 4G, 5G, and the like and that is applied to the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave through the antenna 1 for radiation. In some embodiments, at least some functional modules in the mobile communication module 150 may be disposed in the processor 110. In some embodiments, at least some functional modules of the mobile communication module 150 and at least some modules of the processor 110 may be disposed in a same device.

The wireless communication module 160 may provide a solution that is applied to the terminal device 40 and that is for wireless communication such as a wireless local area network (WLAN) (for example, a Wi-Fi network), Bluetooth (BT), a global navigation satellite system (GNSS), frequency modulation (FM), near field communication ( ) technology, or an infrared (IR) technology. The wireless communication module 160 may be one or more components integrated into at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation. When the terminal device 40 is a first device, that the wireless communication module 160 may provide a solution that is applied to the terminal device 40 and that is for NFC wireless communication means that the first device includes an NFC chip. The NFC chip can improve an NFC wireless communication function. When the terminal device 40 is a second device, that the wireless communication module 160 may provide a solution that is applied to the terminal device 40 and that is for NFC wireless communication means that the first device includes an electronic label (such as a radio frequency identification (RFID) label). An NFC chip, near the electronic label, of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, or the like. The GNSS may include a global positioning system (GPS), a global navigation satellite system (GLONASS), a BeiDou navigation satellite system (BDS), a quasi-zenith satellite system (QZSS), and a satellite based augmentation system (SBAS).

In some embodiments, a function of the memory 402 in FIG. 3 may be implemented by using an internal memory 121, an external memory (such as a Micro SD card) connected to an external memory interface 120 in FIG. 4, or the like.

In some embodiments, a function of the output device 404 in FIG. 3 may be implemented by using a display 194 in FIG. 4. The display 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not limited in this embodiment.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "microphone" or a "microphone"), a headset jack 170D, or the like. This is not limited in this embodiment.

It may be understood that the structure shown in FIG. 4 does not constitute a limitation on the terminal device 40. For example, in some other embodiments, the terminal device 40 may include more or fewer components than those shown in the figure, or combine some components, or split some components, or have different component arrangements. The components shown in the figure may be implemented by using hardware, software, or a combination of software and hardware.

With reference to FIG. 2 to FIG. 4, the following describes in detail a reference signal receiving and sending method provided in the embodiments by using an example in which the network device 30 interacts with any terminal device 40 in FIG. 2. The method is used in a plurality of cycles whose cycle lengths are a first cycle length, and the plurality of cycles include a first cycle and a second cycle. The first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1.

Optionally, in the embodiments, the parameter N may be configured by the network device or may be specified in a protocol. This is not limited herein.

Optionally, in the embodiments, the parameter M may be configured by the network device or may be specified in a protocol. This is not limited herein.

It should be noted that, in the following embodiments, a name of a message between network elements or a name or the like of each parameter in the message is merely an example and may also be another name in specific implementation. This is not limited in this embodiment.

Figure 5:
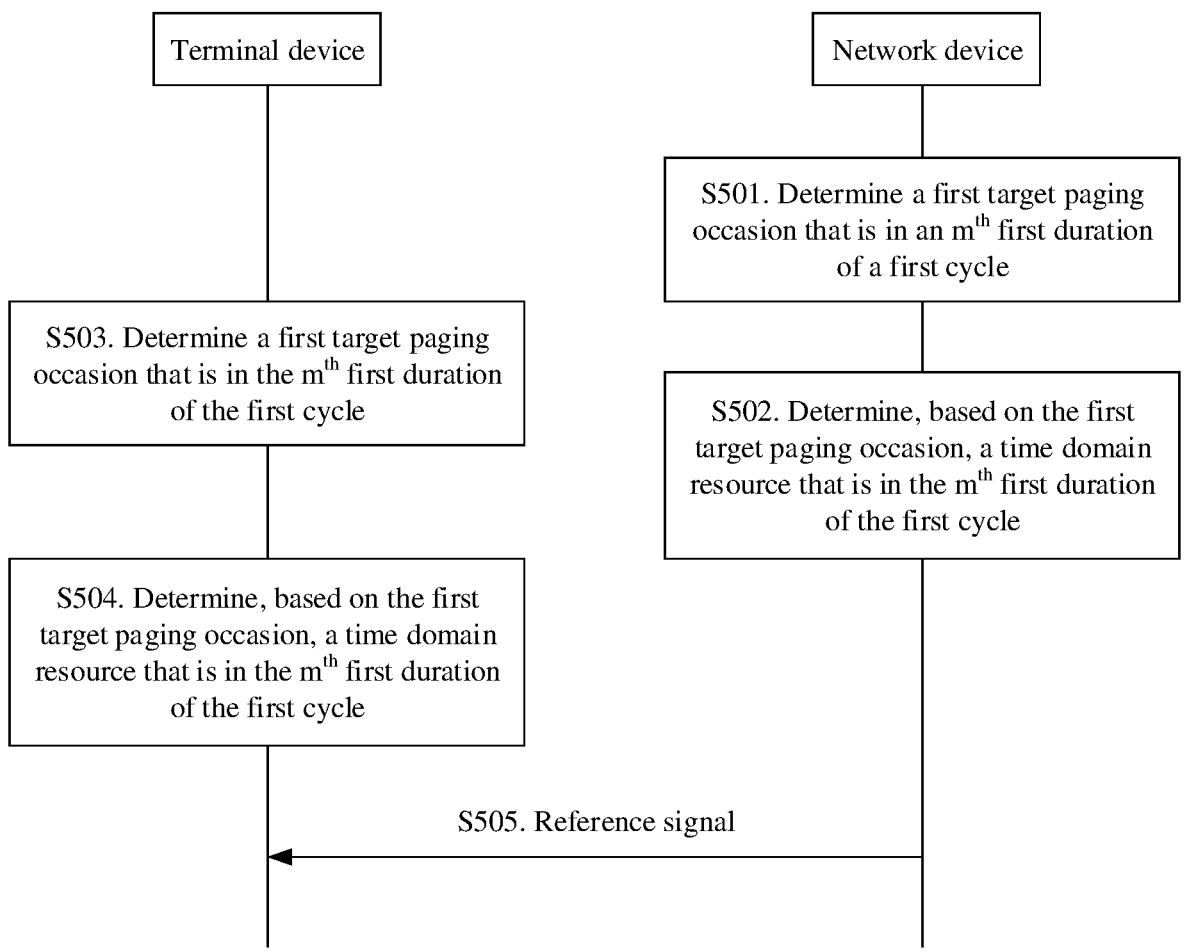
FIG. 5 shows a reference signal receiving and sending method according to an embodiment.

FIG. 5 shows a reference signal receiving and sending method according to an embodiment. The reference signal receiving and sending method includes the following steps.

S501. A network device determines a first target paging occasion that is in an $m^{th}$ first duration of a first cycle.

A relative location of the first target paging occasion in the first cycle is different from a relative location of a second target paging occasion in a second cycle, and the second target paging occasion is a target paging occasion in an $m^{th}$ first duration of the second cycle, where m is any positive integer less than or equal to M.

Optionally, in this embodiment, that a network device determines a first target paging occasion that is in an $m^{th}$ first duration of a first cycle may include: the network device determines a first offset, where the first offset is used to indicate a location of the first target paging occasion in N paging occasions in the $m^{th}$ first duration of the first cycle; and the network device determines, based on the first offset, the first target paging occasion that is in the $m^{th}$ first duration of the first cycle.

Optionally, in this embodiment, there may be one or more first target paging occasions. That the network device determines, based on the first offset, the first target paging occasion that is in the $m^{th}$ first duration of the first cycle may include: if there is one first target paging occasion, the network device determines, based on the first offset, the first target paging occasion that is in the $m^{th}$ first duration of the first cycle; or if there are a plurality of first target paging occasions, the network device determines, based on the first offset, the first one or the last one of the first target paging occasions that are in the $m^{th}$ first duration of the first cycle.

Alternatively, optionally, in this embodiment, that the network device determines, based on the first offset, the first target paging occasion that is in the $m^{th}$ first duration of the first cycle may include: the network device determines, based on an N-bit bitmap and the first offset, the first target paging occasion that is in the $m^{th}$ first duration of the first cycle, where each bit in the N-bit bitmap is used to indicate whether each of the N paging occasions is associated with a reference signal.

Alternatively, optionally, in this embodiment, that the network device determines, based on the first offset, the first target paging occasion that is in the $m^{th}$ first duration of the first cycle may include: the network device determines an index (which may be represented by PO_Index) of a paging occasion that is in the $m^{th}$ first duration of the first cycle, where the index of the paging occasion in the $m^{th}$ first duration of the first cycle is an index, in the first cycle or a reference signal cycle, of the paging occasion in the $m^{th}$ first duration of the first cycle; the network device determines, in the index of the paging occasion in the $m^{th}$ first duration of the first cycle, an index (PO_Index1) of the first target paging occasion that is in the $m^{th}$ first duration of the first cycle based on the first offset; and the network device determines the first target paging occasion based on the index of the first target paging occasion.

Optionally, in this embodiment, PO_Index may be determined based on a sequence number of a frame to which the paging occasion in the $m^{th}$ first duration of the first cycle belongs. In a possible implementation, PO_Index satisfies a formula PO_Index=(A+(floor((B+$SFN_1$)*nB/T+C)+i_s) mod (nB), where floor represents rounding down, $SFN_1$ represents the sequence number of the frame to which the paging occasion in the $m^{th}$ first duration of the first cycle belongs or a sequence number of a frame from which the first cycle starts, T represents the first cycle, A, B, and C are all integers, and mod represents a modulo operation. For related descriptions of nB and i_s, refer to the foregoing formulas (a) and (b). Details are not described herein again. If values of A, B, and C are all 0, PO_Index=(floor($SFN_1$*nB/T)+i_s) mod (nB). $SFN_1$*nB/T is a quantity of POs before the current $SFN_1$ in the first cycle, and $SFN_1$*nB/T+i_s is an index of a PO corresponding to i_s in the current $SFN_1$ in the first cycle. Herein, nB=N1*Ns. Therefore, PO_Index=(floor($SFN_1$*nB/T)+i_s) mod (nB) may be transformed into PO_Index=(floor(SFN*N1*Ns/T)+i_s) mod (N1*Ns). For related descriptions of Ns and N1, refer to the foregoing formulas (a) and (b). Details are not described herein again.

In a possible implementation, PO_Index1 may satisfy (PO_Index1) mod N=First offset. N is a quantity of paging occasions in the $m^{th}$ first duration of the first cycle.

For example, it is assumed that the first cycle is a DRX cycle, N=2, T=128, nB=T (128 POs in total in one DRX cycle), H-SFN=0, Ns=1, N1=128, and i_s=0. Assuming that H-$SFN_1$ represents a sequence number of a hyper frame to which the paging occasion in the $m^{th}$ first duration of the first cycle belongs, and $SFN_1$ represents the sequence number of the frame to which the paging occasion in the $m^{th}$ first duration of the first cycle belongs, for the first DRX cycle, $SFN_1$=0, 1, 2, . . . , 127 is determined according to the formula (a); for the second DRX cycle, $SFN_1$=128, 129, . . . , 255 is determined according to the formula (a).

It may be understood by substituting the foregoing parameters into the following formula (4) and formula (5) that, for the first DRX cycle, the first offset is 0. If values of A, B, and C are all 0, PO_Index=(floor($SFN_1$*nB/T)+i_s) mod (nB). When $SFN_1$=0, PO_Index=(floor(0*128/128)+0) mod 128=0, and PO_Index mod N=0 mod 2=First offset. Therefore, a paging occasion whose PO_Index is 0 is the first target paging occasion. When $SFN_1$=1, PO_Index=(floor(1*128/128)+0) mod 128=1, and PO_Index mod N=1 mod 2≠First offset. Therefore, a paging occasion whose PO_Index is 1 is not the first target paging occasion. When $SFN_1$=2, PO_Index=(floor(2*128/128)+0) mod 128=2, and PO_Index mod N=2 mod 2=First offset. Therefore, a paging occasion whose PO_Index is 2 is the first target paging occasion. The rest may be deduced by analogy.

It may be understood by substituting the foregoing parameters into the following formula (4) and formula (5) that, for the second DRX cycle, the first offset is 1. When $SFN_1=128$, PO_Index=(floor(128*128/128)+0) mod 128=0, and PO_Index mod N=0 mod 2≠First offset. Therefore, a paging occasion whose PO_Index is 0 is not the first target paging occasion. When $SFN_1=129$, PO_Index=(floor(129*128/128)+0) mod 128=1, and PO_Index mod N=1 mod 2=First offset. Therefore, a paging occasion whose PO_Index is 1 is the first target paging occasion. When $SFN_1=130$, PO_Index=(floor(130*128/128)+0) mod 128=2, and PO_Index mod N=2 mod 2≠First offset. Therefore, a paging occasion whose PO_Index is 2 is not the first target paging occasion. The rest may be deduced by analogy.

Optionally, in this embodiment, that a network device determines a first target paging occasion that is in an $m^{th}$ first duration of a first cycle may include: the network device determines a second parameter value based on R, PO_Index, and N, where the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs. For example, when the second parameter value is 1, the second parameter value may indicate that the paging occasion in the $m^{th}$ first duration of the first cycle is the first target paging occasion. When the second parameter value is 0, the second parameter value may indicate that the paging occasion in the $m^{th}$ first duration of the first cycle is not the first target paging occasion. Alternatively, when the second parameter value is 0, the second parameter value may indicate that the paging occasion in the $m^{th}$ first duration of the first cycle is not the first target paging occasion. When the second parameter value is 1, the second parameter value may indicate that the paging occasion in the $m^{th}$ first duration of the first cycle is the first target paging occasion.

In a possible implementation, the second parameter value satisfies a formula: Second parameter value=(A1+B1*PO_Index+C1*R) mod N, where mod represents a modulo operation, and A1, B1, and C1 are all integers.

In a possible implementation, R satisfies a formula: R=floor(($SFN_1$+1024*H-$SFN_1$)/T), where $SFN_1$ represents the sequence number of the frame to which the paging occasion in the $m^{th}$ first duration of the first cycle belongs or the sequence number of the frame from which the first cycle starts, H-$SFN_1$ represents the sequence number of the hyper frame to which the paging occasion in the $m^{th}$ first duration of the first cycle belongs or a sequence number of a hyper frame to which the first cycle belongs, floor represents rounding down, and T represents the first cycle.

In a possible implementation, for a formula that PO_Index satisfies, refer to the foregoing method embodiment. Details are not described herein again.

For example, it is assumed that the first cycle is a DRX cycle, N=2, T=128, nB=T (128 POs in total in one DRX cycle), H-SFN=0, Ns=1, N1=128, and i_s=0. Assuming that H-$SFN_1$ represents the sequence number of the hyper frame to which the paging occasion in the $m^{th}$ first duration of the first cycle belongs, and $SFN_1$ represents the sequence number of the frame to which the paging occasion in the $m^{th}$ first duration of the first cycle belongs, for the first DRX cycle, $SFN_1$=0, 1, 2, . . . , 127 is determined according to the formula (a).

The foregoing parameters are substituted into the foregoing calculation formulas that PO_Index and R separately satisfy, and it is assumed that the values of A1, B1, and C1 are all 0. When $SFN_1$=0, PO_Index=(floor(0*128/128)+0) mod 128=0, R=floor((0+1024*0)/128)=0, and Second parameter value=(0+0) mod 2=0. When $SFN_1$=1, PO_Index=(floor(1*128/128)+0) mod 128=1, R=floor((1+1024*0)/128)=0, and Second parameter value=(1+0) mod 2=1. When $SFN_1$=2, PO_Index=(floor(2*128/128)+0) mod 128=2, R=floor((2+1024*0)/128)=0, and Second parameter value=(2+0) mod 2=0. By analogy, results may be obtained when PO_Index is 0, 1, 2, . . . , and 127, and the second parameter values obtained through calculation are sequentially 0, 1, 0, 1, . . . , 0, and 1.

Alternatively, for example, it is assumed that the first cycle is a DRX cycle, N=2, T=128, nB=T/2 (64 POs in total in one DRX cycle), H-SFN=0, Ns=1, N1=128, and i_s=0. Assuming that H-$SFN_1$ represents the sequence number of the hyper frame to which the paging occasion in the $m^{th}$ first duration of the first cycle belongs, and $SFN_1$ represents the sequence number of the frame to which the paging occasion in the $m^{th}$ first duration of the first cycle belongs, for the first DRX cycle, $SFN_1$=0, 2, 4, . . . , 126 is determined according to the formula (a).

The foregoing parameters are substituted into the foregoing calculation formulas that PO_Index and R separately satisfy, and it is assumed that the values of A1, B1, and C1 are all 0. When $SFN_1$=0, PO_Index=(floor(0*64/128)+0) mod 64=0, R=floor((0+1024*0)/128)=0, and Second parameter value=(0+0) mod 2=0. When $SFN_1$=2, PO_Index=(floor(2*64/128)+0) mod 64=1, R=floor((2+1024*0)/128)=0, and Second parameter value=(1+0) mod 2=1. When $SFN_1$=4, PO_Index=(floor(4*64/128)+0) mod 128=2, R=floor((4+1024*0)/128)=0, and Second parameter value=(2+0) mod 2=0. By analogy, results may be obtained when PO_Index is 0, 1, 2, . . . , and 63, and the second parameter values obtained through calculation are sequentially 0, 1, 0, 1, . . . , 0, and 1.

S502. The network device determines, based on the first target paging occasion, a time domain resource that is in the $m^{th}$ first duration of the first cycle, where the time domain resource is a time domain resource of a time-frequency resource used to transmit the reference signal.

Optionally, the time domain resource of the time-frequency resource in this embodiment is a time domain resource of the time-frequency resource used to transmit the reference signal. Optionally, a frequency domain resource of the time-frequency resource may be, for example, a frequency domain resource of a time-frequency resource on which a paging occasion is currently located. That is, the frequency domain resource of the time-frequency resource used to transmit the reference signal and the frequency domain resource of the time-frequency resource on which the paging occasion is currently located may be a same frequency domain resource. Alternatively, optionally, a frequency domain resource of the time-frequency resource may not be a frequency domain resource of a time-frequency resource on which a paging occasion is currently located. That is, a frequency domain resource of the time-frequency resource used to transmit the reference signal and the frequency domain resource of the time-frequency resource on which the paging occasion is currently located may not be a same frequency domain resource. In this case, the network device may indicate, to a terminal device by using a first frequency domain resource indication parameter, the frequency domain resource of the time-frequency resource used to transmit the reference signal. This is not limited in this embodiment.

S503. The terminal device determines a first target paging occasion that is in the $m^{th}$ first duration of the first cycle.

For related descriptions of the first target paging occasion, refer to the foregoing step S501. Details are not described herein again.

Optionally, in this embodiment, that the terminal device determines a first target paging occasion that is in the $m^{th}$ first duration of the first cycle may include: the terminal device determines a first offset, where the first offset is used to indicate a location of the first target paging occasion in N paging occasions in the $m^{th}$ first duration of the first cycle; and the terminal device determines, based on the first offset, the first target paging occasion that is in the $m^{th}$ first duration of the first cycle.

Optionally, in this embodiment, there may be one or more first target paging occasions. That the terminal device determines, based on the first offset, the first target paging occasion that is in the $m^{th}$ first duration of the first cycle may include: if there is one first target paging occasion, the terminal device determines, based on the first offset, the first target paging occasion that is in the $m^{th}$ first duration of the first cycle; or if there are a plurality of first target paging occasions, the terminal device determines, based on the first offset, the first one or the last one of the first target paging occasions that are in the $m^{th}$ first duration of the first cycle.

Alternatively, optionally, in this embodiment, the network device may send the N-bit bitmap to the terminal device, and the terminal device may receive the N-bit bitmap from the network device. Each bit in the N-bit bitmap is used to indicate whether each of the N paging occasions is associated with the reference signal. Correspondingly, that the terminal device determines, based on the first offset, the first target paging occasion that is in the $m^{th}$ first duration of the first cycle may include: the terminal device determines, based on the N-bit bitmap and the first offset, the first target paging occasion that is in the $m^{th}$ first duration of the first cycle.

Alternatively, optionally, in this embodiment, that the terminal device determines, based on the first offset, the first target paging occasion that is in the $m^{th}$ first duration of the first cycle may include: the terminal device determines an index (which may be represented by PO_Index) of a paging occasion that is in the $m^{th}$ first duration of the first cycle, where the index of the paging occasion in the $m^{th}$ first duration of the first cycle is an index, in the first cycle or a reference signal cycle, of the paging occasion in the $m^{th}$ first duration of the first cycle; the terminal device determines, in the index of the paging occasion in the $m^{th}$ first duration of the first cycle, an index (PO_Index1) of the first target paging occasion that is in the $m^{th}$ first duration of the first cycle based on the first offset; and the terminal device determines the first target paging occasion based on the index of the first target paging occasion.

For related descriptions of PO_Index and PO_Index1, refer to the foregoing step S501. Details are not described herein again.

Optionally, in this embodiment, that the terminal device determines a first target paging occasion that is in the $m^{th}$ first duration of the first cycle may include: the terminal device determines a second parameter value based on R, PO_Index, and N, where the second parameter value is used to indicate whether a paging occasion in the $m^{th}$ first duration of the first cycle is the first target paging occasion. For related descriptions of the second parameter value, N, R, and PO_Index, refer to the foregoing step S501. Details are not described herein again.

S504. The terminal device determines, based on the first target paging occasion, a time domain resource that is in the $m^{th}$ first duration of the first cycle, where the time domain resource is a time domain resource of a time-frequency resource used to transmit the reference signal.

S505. The network device sends the reference signal to the terminal device on the time-frequency resource, and the terminal device receives the reference signal from the network device on the time-frequency resource.

Optionally, in this embodiment, if N=1 (that is, the first duration includes only one paging occasion), the terminal device and the network device may determine the paging occasion as a target paging occasion, and further determine, based on the paging occasion, a time domain resource that is in the $m^{th}$ first duration of the first cycle. The time domain resource is a time domain resource of a time-frequency resource used to transmit the reference signal. This is not limited in this embodiment.

In the foregoing steps S501 to S505:

Optionally, in this embodiment, if a cycle length of the reference signal is set to X multiplied by a first cycle length, the parameter N may be the same as or different from the parameter X. This is not limited herein. When the parameter N is the same as the parameter X, the parameter X may not be configured, and the cycle length of the reference signal is equal to N multiplied by the first cycle length by default. This is not limited herein.

Optionally, both the first cycle and the second cycle in this embodiment may be DRX cycles. Further, the first cycle and the second cycle may alternatively be other cycles longer than or shorter than the DRX cycles. This is not limited in this embodiment.

Optionally, the reference signal in this embodiment may be, for example, an NRS.

Optionally, in this embodiment, there may be one or more reference signal subframes associated with the first target paging occasion. This is not limited in this embodiment.

Optionally, the first offset in this embodiment may be configured by the network device, may be calculated by the network device and the terminal device, or may be specified in a protocol. This is not limited herein.

In a possible implementation, the first offset is determined based on a first parameter value, the first cycle length, and N; and the first parameter value may be determined based on one or both of a sequence number of a frame from which the first cycle starts or a sequence number of a hyper frame to which the first cycle belongs; or the first parameter value may be determined based on a cycle length of the reference signal and one or both of a sequence number of a frame from which the first cycle starts or a sequence number of a hyper frame to which the first cycle belongs.

For example, the first offset, the first parameter value, the first cycle length, and N may satisfy the following formula (4):

$$\text{First offset} = (\text{First parameter value}/\text{First cycle length}) \bmod N \quad \text{Formula (4)}$$

where mod represents a modulo operation.

For example, it is assumed that the sequence number of the frame from which the first cycle starts or the sequence number of the frame to which the paging occasion in the $m^{th}$ first duration of the first cycle belongs is denoted as cycle_start_SFN (which may be referred to as $SFN_1$), and the sequence number of the hyper frame to which the first cycle belongs or the sequence number of the hyper frame to which the paging occasion in the $m^{th}$ first duration of the first cycle belongs is denoted as cycle_H-SFN (which may be referred to as $H\text{-}SFN_1$). When cycle_start_SFN represents the sequence number of the frame from which the first cycle starts, cycle_start_SFN satisfies: (cycle_start_SFN) mod (T1)=0, where T1 is the first cycle length. The first parameter value and one or both of cycle_start_SFN or cycle_H-SFN may satisfy the following formula (5), formula (6), or formula (7):

$$\text{First parameter value} = \text{cycle\_}H\text{-SFN}*1024 + \text{cycle\_start\_SFN} \qquad \text{Formula (5)}$$

$$\text{First parameter value} = \text{cycle\_start\_SFN} \qquad \text{Formula (6)}$$

$$\text{First parameter value} = \text{cycle\_}H\text{-SFN}*1024 \qquad \text{Formula (7)}$$

Alternatively, for example, assuming that the sequence number of the frame from which the first cycle starts is denoted as cycle_start_SFN, and the sequence number of the hyper frame to which the first cycle belongs is denoted as cycle_H-SFN, cycle_start_SFN satisfies: (cycle_start_SFN) mod (T1)=0, where T1 is the first cycle length. The first parameter value, the cycle length of the reference signal (which, for example, is denoted as T2), and one or both of cycle_start_SFN or cycle_H-SFN may satisfy the following formula (8), formula (9), or formula (10):

$$\text{First parameter value} = (\text{cycle\_}H\text{-SFN}*1024 + \text{cycle\_start\_SFN}) \bmod (T2) \qquad \text{Formula (8)}$$

$$\text{First parameter value} = (\text{cycle\_start\_SFN}) \bmod (T2) \qquad \text{Formula (9)}$$

$$\text{First parameter value} = (\text{cycle\_}H\text{-SFN}*1024) \bmod (T2) \qquad \text{Formula (10)}$$

It should be noted that, because the first offset determined according to the formula (4) may be a fractional value, in this embodiment, the first offset may alternatively satisfy: First offset=(floor(First parameter value/First cycle length)) mod N, where floor represents rounding down. This is not limited in this embodiment.

Further, in this embodiment, the terminal device and the network device may also determine, in the foregoing manner of determining the first target paging occasion that is in the $m^{th}$ first duration of the first cycle, the second target paging occasion that is in the $m^{th}$ first duration of the second cycle. Details are not described herein again.

The following provides descriptions with reference to several specific examples.

Example 1

It is assumed that in this embodiment, the first cycle and the second cycle are DRX cycles, and the DRX cycle includes 128 system frames (which may be referred to as frames). In this case, one hyper frame is equal to eight DRX cycles, which are denoted as the first DRX cycle, the second DRX cycle, . . . , the $s^{th}$ DRX cycle, . . . , and the eighth DRX cycle, where s is a positive integer. A sequence number of a frame from which the $s^{th}$ DRX cycle starts is denoted as cycle(s)_start_SFN. For example, a sequence number of a frame from which the first DRX cycle starts is denoted as cycle1_start_SFN. A sequence number of a hyper frame to which the $s^{th}$ DRX cycle belongs is denoted as cycle(s)_H-SFN. For example, a sequence number of a hyper frame to which the first DRX cycle belongs is denoted as cycle1_H-SFN. Herein, it is assumed that cycle1_H-SFN to cycle8_H-SFN are all 0, that is, hyper frames to which the first DRX cycle to the eighth DRX cycle belong are the first hyper frame. In this case, it may be determined according to the foregoing formula (5) that:

Parameter value 1 of the first DRX cycle=cycle1_H-SFN*1024+cycle1_start_SFN=0;

Parameter value 2 of the second DRX cycle=cycle2_H-SFN*1024+cycle2_start_SFN=128;

Parameter value 3 of the third DRX cycle=cycle3_H-SFN*1024+cycle3_start_SFN=256;

Parameter value 4 of the fourth DRX cycle=cycle4_H-SFN*1024+cycle4_start_SFN=384;

Parameter value 5 of the fifth DRX cycle=cycle5_H-SFN*1024+cycle5_start_SFN=512;

Parameter value 6 of the sixth DRX cycle=cycle6_H-SFN*1024+cycle6_start_SFN=640;

Parameter value 7 of the seventh DRX cycle=cycle7_H-SFN*1024+cycle7_start_SFN=768; and Parameter value 8 of the eighth DRX cycle=cycle8_H-SFN*1024+cycle8_start_SFN=896.

Alternatively, it may be determined according to the foregoing formula (6) that:

Parameter value 1 of the first DRX cycle=cycle1_start_SFN=0;

Parameter value 2 of the second DRX cycle=cycle2_start_SFN=128;

Parameter value 3 of the third DRX cycle=cycle3_start_SFN=256;

Parameter value 4 of the fourth DRX cycle=cycle4_start_SFN=384;

Parameter value 5 of the fifth DRX cycle=cycle5_start_SFN=512;

Parameter value 6 of the sixth DRX cycle=cycle6_start_SFN=640;

Parameter value 7 of the seventh DRX cycle=cycle7_start_SFN=768; and

Parameter value 8 of the eighth DRX cycle=cycle8_start_SFN=896.

Further, it is assumed that the first DRX cycle to the eighth DRX cycle each include four first durations (that is, M=4), and each first duration includes four paging occasions (that is, N=4). In this case, it may be determined according to the foregoing formula (4) that:

Offset 1 of the first DRX cycle=((Parameter value 1)/128) mod 4=0;

Offset 2 of the second DRX cycle=((Parameter value 2)/128) mod 4=1;

Offset 3 of the third DRX cycle=((Parameter value 3)/128) mod 4=2;

Offset 4 of the fourth DRX cycle=((Parameter value 4)/128) mod 4=3;

Offset 5 of the fifth *DRX* cycle=((Parameter value 5)/128)mod 4=0;

Offset 6 of the sixth *DRX* cycle=((Parameter value 6)/128)mod 4=1;

Offset 7 of the seventh *DRX* cycle=((Parameter value 7)/128)mod 4=2; and

Offset 8 of the eighth *DRX* cycle=((Parameter value 8)/128)mod 4=3.

It is assumed that there is one first target paging occasion.

Figure 6:
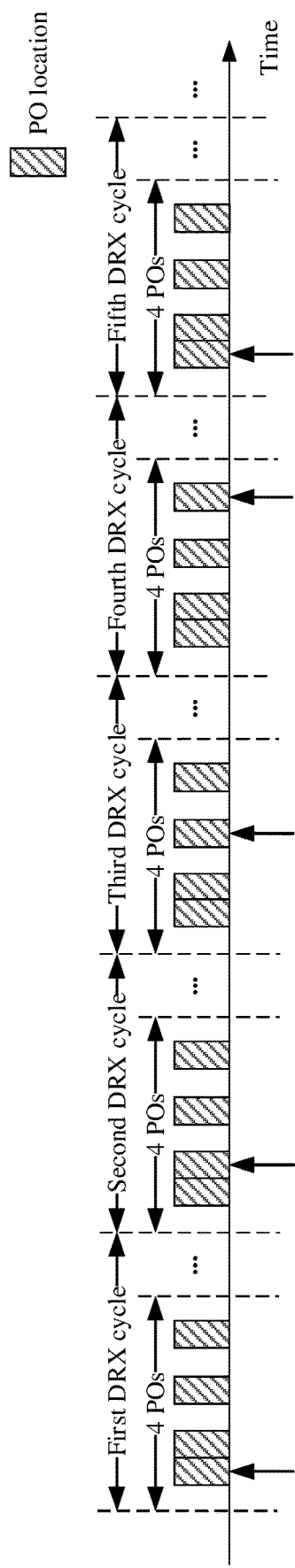
FIG. 6 is a first schematic distribution diagram of target paging occasions according to an embodiment.

The first offset in the formula (4) is used to indicate the location of the first target paging occasion in the N paging occasions in the $m^{th}$ first duration of the first cycle. In this case, the $1^{st}$ first duration (that is, m=1) of each DRX cycle is used as an example. As shown in FIG. 6, in the first DRX cycle, the target paging occasion in the $1^{st}$ first duration is the first paging occasion in the four paging occasions. In the second DRX cycle, the target paging occasion in the $1^{st}$ first duration is the second paging occasion in the four paging occasions. In the third DRX cycle, the target paging occasion in the $1^{st}$ first duration is the third paging occasion in the four paging occasions. In the fourth DRX cycle, the target paging occasion in the $1^{st}$ first duration is the fourth paging occasion in the four paging occasions. In the fifth DRX cycle, the target paging occasion in the $1^{st}$ first duration is the first paging occasion in the four paging occasions. In the sixth DRX cycle, the target paging occasion in the $1^{st}$ first duration is the second paging occasion in the four paging occasions. In the seventh DRX cycle, the target paging occasion in the $1^{st}$ first duration is the third paging occasion in the four paging occasions. In the eighth DRX cycle, the target paging occasion in the $1^{st}$ first duration is the fourth paging occasion in the four paging occasions.

Alternatively, it is assumed that there are a plurality of first target paging occasions (three paging occasions are used as an example for description herein). The first offset in the formula (4) is used to indicate a location of the first one of the first target paging occasions in the N paging occasions in the $m^{th}$ first duration of the first cycle.

Figure 7:
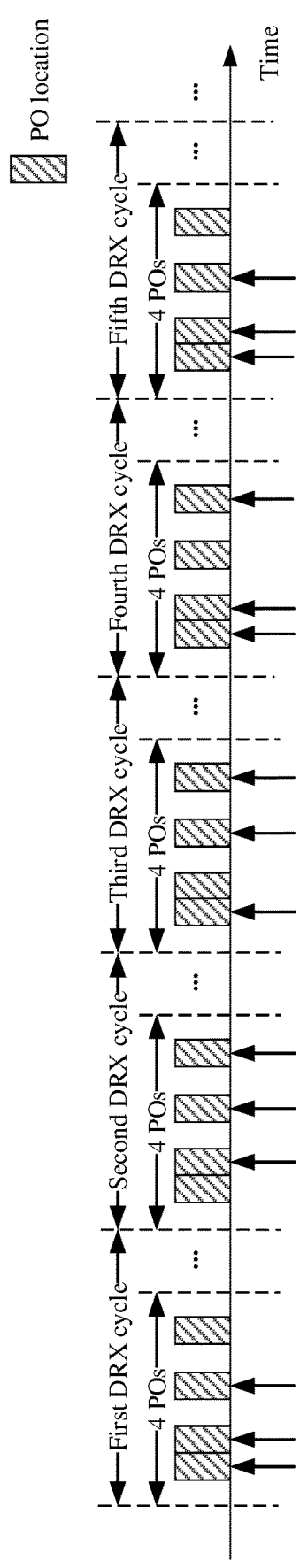
FIG. 7 is a second schematic distribution diagram of target paging occasions according to an embodiment.

In this case, the $1^{st}$ first duration (that is, m=1) in each DRX cycle is used as an example. As shown in FIG. 7, in the first DRX cycle, target paging occasions in the $1^{st}$ first duration are the first paging occasion, the second paging occasion, and the third paging occasion in the four paging occasions. In the second DRX cycle, target paging occasions in the $1^{st}$ first duration are the second paging occasion, the third paging occasion, and the fourth paging occasion in the four paging occasions. In the third DRX cycle, target paging occasions in the $1^{st}$ first duration are the third paging occasion, the fourth paging occasion, and the first paging occasion in the four paging occasions. In the fourth DRX cycle, target paging occasions in the $1^{st}$ first duration are the fourth paging occasion, the first paging occasion, and the second paging occasion in the four paging occasions. In the fifth DRX cycle, target paging occasions in the $1^{st}$ first duration are the first paging occasion, the second paging occasion, and the third paging occasion in the four paging occasions. In the sixth DRX cycle, target paging occasions in the $1^{st}$ first duration are the second paging occasion, the third paging occasion, and the fourth paging occasion in the four paging occasions. In the seventh DRX cycle, target paging occasions in the $1^{st}$ first duration are the third paging occasion, the fourth paging occasion, and the first paging occasion in the four paging occasions. In the eighth DRX cycle, target paging occasions in the $1^{st}$ first duration are the fourth paging occasion, the first paging occasion, and the second paging occasion in the four paging occasions.

Alternatively, it is assumed that there are a plurality of first target paging occasions (two paging occasions are used as an example for description herein). The first offset in the formula (4) is used to indicate a location of the last one of the first target paging occasions in the N paging occasions in the $m^{th}$ first duration of the first cycle.

Figure 8:
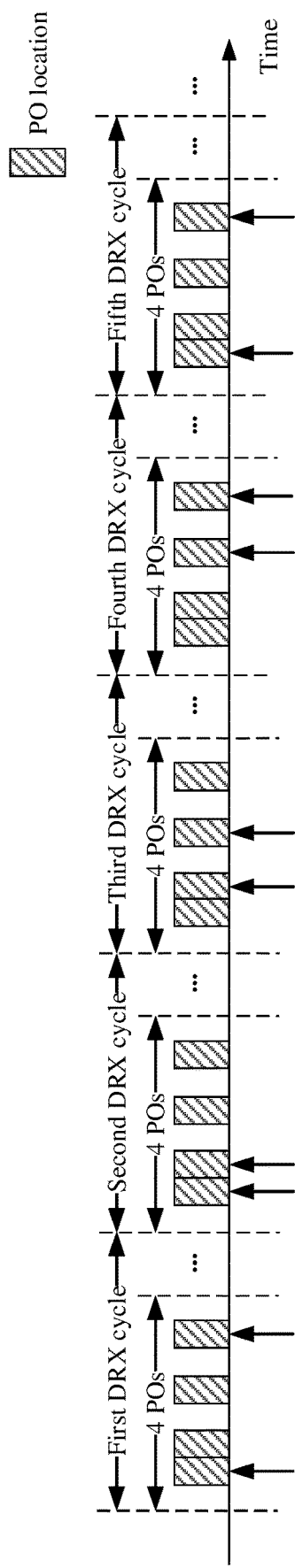
FIG. 8 is a third schematic distribution diagram of target paging occasions according to an embodiment.

In this case, the $1^{st}$ first duration (that is, m=1) in each DRX cycle is used as an example. As shown in FIG. 8, in the first DRX cycle, target paging occasions in the $1^{st}$ first duration are the first paging occasion and the fourth paging occasion in the four paging occasions. In the second DRX cycle, target paging occasions in the $1^{st}$ first duration are the second paging occasion and the first paging occasion in the four paging occasions. In the third DRX cycle, target paging occasions in the $1^{st}$ first duration are the third paging occasion and the second paging occasion in the four paging occasions. In the fourth DRX cycle, target paging occasions in the $1^{st}$ first duration are the fourth paging occasion and the third paging occasion in the four paging occasions. In the fifth DRX cycle, target paging occasions in the $1^{st}$ first duration are the first paging occasion and the fourth paging occasion in the four paging occasions. In the sixth DRX cycle, target paging occasions in the $1^{st}$ first duration are the second paging occasion and the first paging occasion in the four paging occasions. In the seventh DRX cycle, target paging occasions in the $1^{st}$ first duration are the third paging occasion and the second paging occasion in the four paging occasions. In the eighth DRX cycle, target paging occasions in the $1^{st}$ first duration are the fourth paging occasion and the third paging occasion in the four paging occasions.

Alternatively, it is assumed that the N-bit bitmap is 0110, where 0 indicates being not associated with the reference signal, and 1 indicates being associated with the reference signal (further, alternatively, it may also be that 0 indicates being associated with the reference signal, and 1 indicates being not associated with the reference signal, which is not limited herein).

Figure 9:
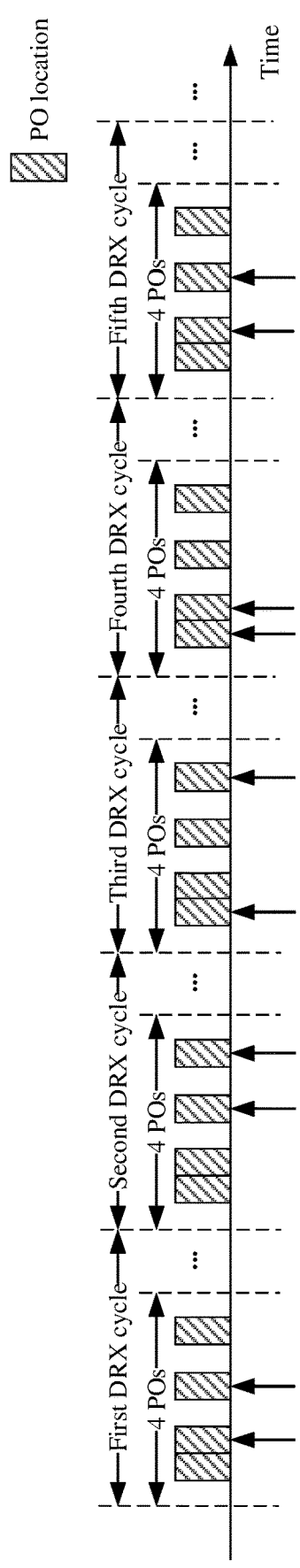
FIG. 9 is a fourth schematic distribution diagram of target paging occasions according to an embodiment.

In this case, the $1^{st}$ first duration (that is, m=1) in each DRX cycle is used as an example. As shown in FIG. 9, in the first DRX cycle, target paging occasions in the $1^{st}$ first duration are the second paging occasion and the third paging occasion in the four paging occasions. In the second DRX cycle, target paging occasions in the $1^{st}$ first duration are the third paging occasion and the fourth paging occasion in the four paging occasions. In the third DRX cycle, target paging occasions in the $1^{st}$ first duration are the fourth paging occasion and the first paging occasion in the four paging occasions. In the fourth DRX cycle, target paging occasions in the $1^{st}$ first duration are the first paging occasion and the second paging occasion in the four paging occasions. In the fifth DRX cycle, target paging occasions in the $1^{st}$ first duration are the second paging occasion and the third paging occasion in the four paging occasions. In the sixth DRX cycle, target paging occasions in the $1^{st}$ first duration are the third paging occasion and the fourth paging occasion in the four paging occasions. In the seventh DRX cycle, target paging occasions in the $1^{st}$ first duration are the fourth paging occasion and the first paging occasion in the four paging occasions. In the eighth DRX cycle, target paging occasions in the $1^{st}$ first duration are the first paging occasion and the second paging occasion in the four paging occasions.

Because the target paging occasion is associated with the reference signal, it can be understood from FIG. 6 to FIG. 9 that, in this example, the cycle of the reference signal is four DRX cycles. Each of the N POs in the first duration has an associated reference signal in different DRX cycles. However, because the terminal device monitors only one PO in each DRX cycle, and different terminal devices monitor POs at different locations, when different terminal devices monitor different POs, in a plurality of different DRX cycles, the POs monitored by different terminal devices each have an opportunity to be associated with a reference signal in one of the DRX cycles, and a case in which POs monitored by some terminal devices do not have an associated reference signal is avoided. Therefore, this solution is fairer to a plurality of terminal devices.

Example 2

It is assumed that in this embodiment, the first cycle and the second cycle are DRX cycles, and the DRX cycle includes 128 system frames (which may be referred to as frames). In this case, one hyper frame is equal to eight DRX cycles, which are denoted as the first DRX cycle, the second DRX cycle, . . . , the $s^{th}$ DRX cycle, . . . , and the eighth DRX cycle, where s is a positive integer. A sequence number of a frame from which the $s^{th}$ DRX cycle starts is denoted as cycle(s)_start_SFN. For example, a sequence number of a frame from which the first DRX cycle starts is denoted as cycle1_start_SFN. A sequence number of a hyper frame to which the $s^{th}$ DRX cycle belongs is denoted as cycle(s)_H-SFN. For example, a sequence number of a hyper frame to which the first DRX cycle belongs is denoted as cycle1_H-SFN. Herein, it is assumed that cycle1_H-SFN to cycle8_H-SFN are all 0, that is, hyper frames to which the first DRX cycle to the eighth DRX cycle belong are the first hyper frame, and the cycle of the reference signal is two DRX cycles, that is, 256 frames. In this case, it may be determined according to the foregoing formula (8) that:

Parameter value 1 of the first $DRX$ cycle=(cycle1_$H$-SFN*1024+cycle1_start_SFN)mod 256=0;

Parameter value 2 of the second $DRX$ cycle= (cycle2_$H$-SFN*1024+cycle2_start_SFN)mod 256=128;

Parameter value 3 of the third $DRX$ cycle= (cycle3_$H$-SFN*1024+cycle3_start_SFN)mod 256=0;

Parameter value 4 of the fourth $DRX$ cycle= (cycle4_$H$-SFN*1024+cycle4_start_SFN)mod 256=128;

Parameter value 5 of the fifth $DRX$ cycle= (cycle5_$H$-SFN*1024+cycle5_start_SFN)mod 256=0;

Parameter value 6 of the sixth $DRX$ cycle= (cycle6_$H$-SFN*1024+cycle6_start_SFN)mod 256=128;

Parameter value 7 of the seventh $DRX$ cycle= (cycle7_$H$-SFN*1024+cycle7_start_SFN)mod 256=0; and Parameter value 8 of the eighth $DRX$ cycle= (cycle8_$H$-SFN*1024+cycle8_start_SFN)mod 256=128.

Alternatively, it may be determined according to the foregoing formula (9) that:

Parameter value 1 of the first $DRX$ cycle= (cycle1_start_SFN)mod 256=0;

Parameter value 2 of the second $DRX$ cycle= (cycle2_start_SFN)mod 256=128;

Parameter value 3 of the third $DRX$ cycle= (cycle3_start_SFN)mod 256=0;

Parameter value 4 of the fourth $DRX$ cycle= (cycle4_start_SFN)mod 256=128;

Parameter value 5 of the fifth $DRX$ cycle= (cycle5_start_SFN)mod 256=0;

Parameter value 6 of the sixth $DRX$ cycle= (cycle6_start_SFN)mod 256=128;

Parameter value 7 of the seventh $DRX$ cycle= (cycle7_start_SFN)mod 256=0; and

Parameter value 8 of the eighth $DRX$ cycle= (cycle8_start_SFN)mod 256=128.

Further, it is assumed that the first DRX cycle to the eighth DRX cycle each include four first durations (that is, M=4), and each first duration includes four paging occasions (that is, N=4). In this case, it may be determined according to the foregoing formula (4) that:

Offset 1 of the first $DRX$ cycle=((Parameter value 1)/128)mod 4=0;

Offset 2 of the second $DRX$ cycle=((Parameter value 2)/128)mod 4=1;

Offset 3 of the third $DRX$ cycle=((Parameter value 3)/128)mod 4=0;

Offset 4 of the fourth $DRX$ cycle=((Parameter value 4)/128)mod 4=1;

Offset 5 of the fifth $DRX$ cycle=((Parameter value 5)/128)mod 4=0;

Offset 6 of the sixth $DRX$ cycle=((Parameter value 6)/128)mod 4=1;

Offset 7 of the seventh $DRX$ cycle=((Parameter value 7)/128)mod 4=0; and

Offset 8 of the eighth $DRX$ cycle=((Parameter value 8)/128)mod 4=1.

Figure 10:
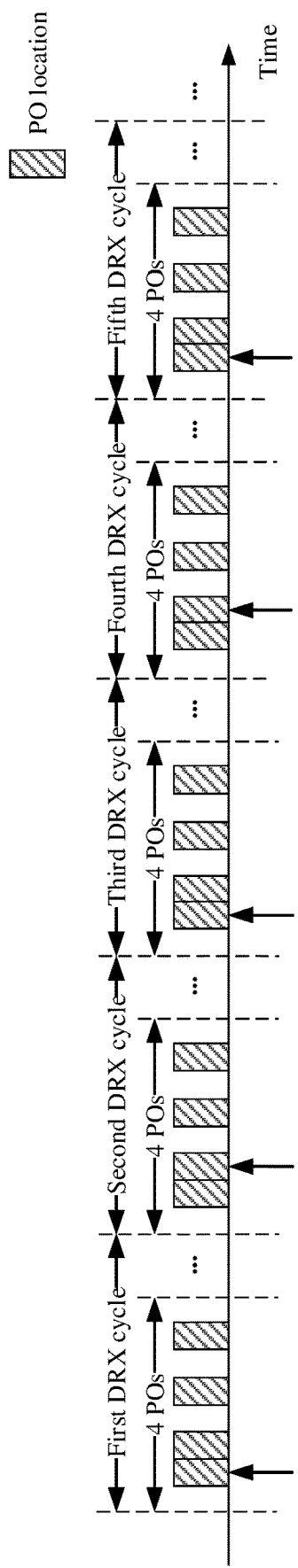
FIG. 10 is a fifth schematic distribution diagram of target paging occasions according to an embodiment.

It is assumed that there is one first target paging occasion. The first offset in the formula (4) is used to indicate the location of the first target paging occasion in the N paging occasions in the $m^{th}$ first duration of the first cycle. In this case, the $1^{st}$ first duration (that is, m=1) of each DRX cycle is used as an example. As shown in FIG. 10, in the first DRX cycle, the target paging occasion in the $1^{st}$ first duration is the first paging occasion in the four paging occasions. In the second DRX cycle, the target paging occasion in the $1^{st}$ first duration is the second paging occasion in the four paging occasions. In the third DRX cycle, the target paging occasion in the Pt first duration is the first paging occasion in the four paging occasions. In the fourth DRX cycle, the target paging occasion in the $1^{st}$ first duration is the second paging occasion in the four paging occasions. In the fifth DRX cycle, the target paging occasion in the $1^{st}$ first duration is the first paging occasion in the four paging occasions. In the sixth DRX cycle, the target paging occasion in the $1^{st}$ first duration is the second paging occasion in the four paging occasions. In the seventh DRX cycle, the target paging occasion in the $1^{st}$ first duration is the first paging occasion in the four paging occasions. In the eighth DRX cycle, the target paging occasion in the 1$^{st}$ first duration is the second paging occasion in the four paging occasions.

Alternatively, it is assumed that there are a plurality of first target paging occasions (three paging occasions are used as an example for description herein). The first offset in the formula (4) is used to indicate a location of the first one of the first target paging occasions in the N paging occasions in the m$^{th}$ first duration of the first cycle.

Figure 11:
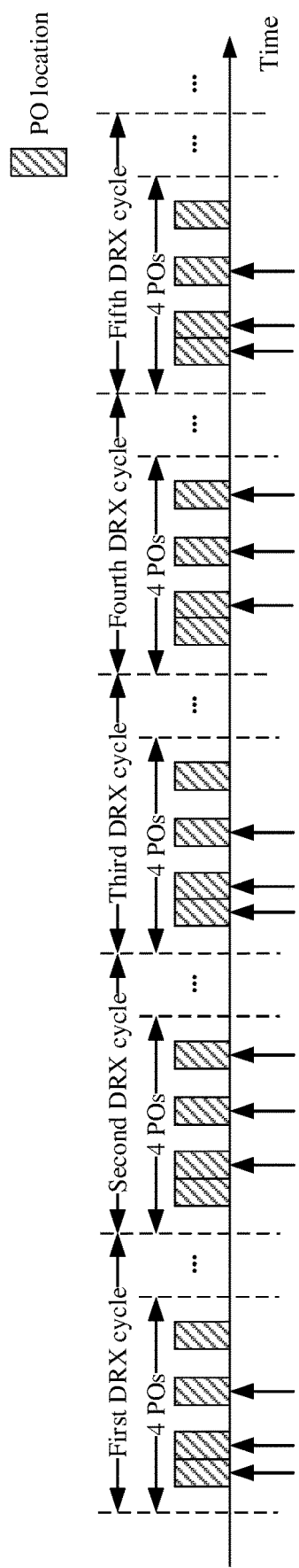
FIG. 11 is a sixth schematic distribution diagram of target paging occasions according to an embodiment.

In this case, the 1$^{st}$ first duration (that is, m=1) in each DRX cycle is used as an example. As shown in FIG. 11, in the first DRX cycle, target paging occasions in the 1$^{st}$ first duration are the first paging occasion, the second paging occasion, and the third paging occasion in the four paging occasions. In the second DRX cycle, target paging occasions in the 1$^{st}$ first duration are the second paging occasion, the third paging occasion, and the fourth paging occasion in the four paging occasions. In the third DRX cycle, target paging occasions in the 1$^{st}$ first duration are the first paging occasion, the second paging occasion, and the third paging occasion in the four paging occasions. In the fourth DRX cycle, target paging occasions in the 1$^{st}$ first duration are the second paging occasion, the third paging occasion, and the fourth paging occasion in the four paging occasions. In the fifth DRX cycle, target paging occasions in the 1$^{st}$ first duration are the first paging occasion, the second paging occasion, and the third paging occasion in the four paging occasions. In the sixth DRX cycle, target paging occasions in the 1$^{st}$ first duration are the second paging occasion, the third paging occasion, and the fourth paging occasion in the four paging occasions. In the seventh DRX cycle, target paging occasions in the 1$^{st}$ first duration are the first paging occasion, the second paging occasion, and the third paging occasion in the four paging occasions. In the eighth DRX cycle, target paging occasions in the 1$^{st}$ first duration are the second paging occasion, the third paging occasion, and the fourth paging occasion in the four paging occasions.

Alternatively, it is assumed that there are a plurality of first target paging occasions (two paging occasions are used as an example for description herein). The first offset in the formula (4) is used to indicate a location of the last one of the first target paging occasions in the N paging occasions in the m$^{th}$ first duration of the first cycle.

Figure 12:
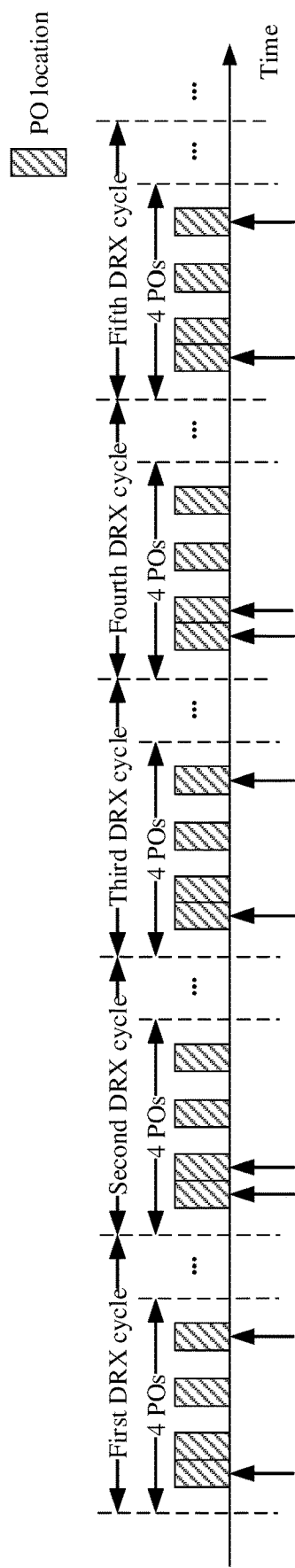
FIG. 12 is a seventh schematic distribution diagram of target paging occasions according to an embodiment.

In this case, the 1$^{st}$ first duration (that is, m=1) in each DRX cycle is used as an example. As shown in FIG. 12, in the first DRX cycle, target paging occasions in the 1$^{st}$ first duration are the first paging occasion and the fourth paging occasion in the four paging occasions. In the second DRX cycle, target paging occasions in the 1$^{st}$ first duration are the second paging occasion and the first paging occasion in the four paging occasions. In the third DRX cycle, target paging occasions in the 1$^{st}$ first duration are the first paging occasion and the fourth paging occasion in the four paging occasions. In the fourth DRX cycle, target paging occasions in the 1$^{st}$ first duration are the second paging occasion and the first paging occasion in the four paging occasions. In the fifth DRX cycle, target paging occasions in the 1$^{st}$ first duration are the first paging occasion and the fourth paging occasion in the four paging occasions. In the sixth DRX cycle, target paging occasions in the 1$^{st}$ first duration are the second paging occasion and the first paging occasion in the four paging occasions. In the seventh DRX cycle, target paging occasions in the 1$^{st}$ first duration are the first paging occasion and the fourth paging occasion in the four paging occasions. In the eighth DRX cycle, target paging occasions in the 1$^{st}$ first duration are the second paging occasion and the first paging occasion in the four paging occasions.

Alternatively, it is assumed that the N-bit bitmap is 0110, where 0 indicates being not associated with the reference signal, and 1 indicates being associated with the reference signal (further, alternatively, it may also be that 0 indicates being associated with the reference signal, and 1 indicates being not associated with the reference signal, which is not limited herein).

Figure 13:
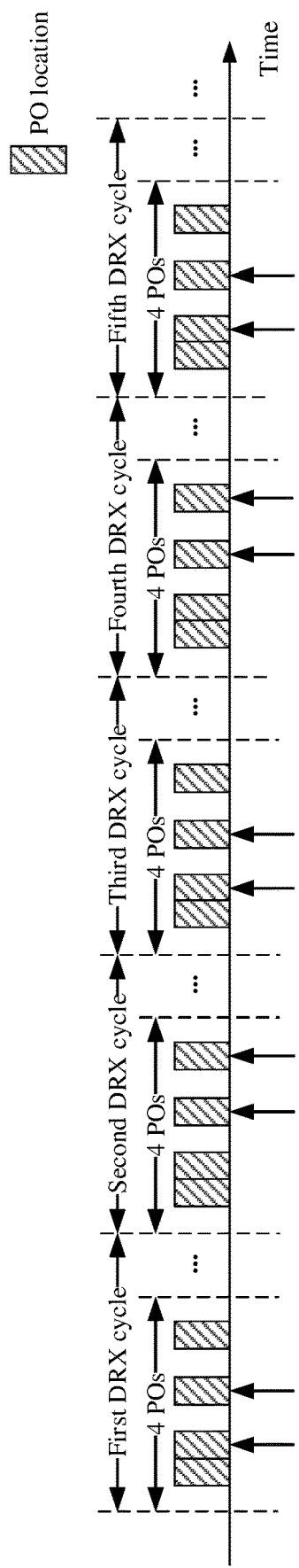
FIG. 13 is an eighth schematic distribution diagram of target paging occasions according to an embodiment.

In this case, the 1$^{st}$ first duration (that is, m=1) in each DRX cycle is used as an example. As shown in FIG. 13, in the first DRX cycle, target paging occasions in the 1$^{st}$ first duration are the second paging occasion and the third paging occasion in the four paging occasions. In the second DRX cycle, target paging occasions in the 1$^{st}$ first duration are the third paging occasion and the fourth paging occasion in the four paging occasions. In the third DRX cycle, target paging occasions in the 1$^{st}$ first duration are the second paging occasion and the third paging occasion in the four paging occasions. In the fourth DRX cycle, target paging occasions in the 1$^{st}$ first duration are the third paging occasion and the fourth paging occasion in the four paging occasions. In the fifth DRX cycle, target paging occasions in the 1$^{st}$ first duration are the second paging occasion and the third paging occasion in the four paging occasions. In the sixth DRX cycle, target paging occasions in the 1$^{st}$ first duration are the third paging occasion and the fourth paging occasion in the four paging occasions. In the seventh DRX cycle, target paging occasions in the 1$^{st}$ first duration are the second paging occasion and the third paging occasion in the four paging occasions. In the eighth DRX cycle, target paging occasions in the 1$^{st}$ first duration are the third paging occasion and the fourth paging occasion in the four paging occasions.

Because the target paging occasion is associated with the reference signal, it can be understood from FIG. 10 to FIG. 13 that, in this example, the cycle of the reference signal is two DRX cycles. A plurality of POs in the N POs in the first duration each have an associated reference signal in different DRX cycles. However, because the terminal device monitors only one PO in each DRX cycle, and different terminal devices monitor POs at different locations, when different terminal devices monitor different POs, in a plurality of different DRX cycles, POs monitored by different terminal devices each have an opportunity to be associated with a reference signal in one of the DRX cycles, and a case in which POs monitored by some terminal devices do not have an associated reference signal is avoided. Therefore, this solution is fairer to a plurality of terminal devices. Additionally, in this example, if the cycle of the reference signal is four DRX cycles, that is, 512 frames, schematic distribution diagrams of finally determined target paging occasions in different DRX cycles are shown in FIG. 6 to FIG. 9. That is, each of the N POs in the first duration has an associated reference signal in different DRX cycles. Details are not described herein again.

Example 3

It is assumed that the first cycle length in this embodiment is equal to one hyper frame, and a sequence number of a hyper frame to which a t$^{th}$ cycle belongs is denoted as cycle(t)_H-SFN, where t is a positive integer. For example, a sequence number of a hyper frame to which the first cycle belongs is denoted as cycle1_H-SFN. In this case, it can be determined according to the foregoing formula (7) that:

Parameter value 1 of the first cycle=cycle1_$H$-SFN*1024=0;

Parameter value 2 of the second cycle=cycle2_H-SFN*1024=1024;

Parameter value 3 of the third cycle=cycle3_H-SFN*1024=2048;

Parameter value 4 of the fourth cycle=cycle4_H-SFN*1024=3072;

Parameter value 5 of the fifth cycle=cycle5_H-SFN*1024=4096;

Parameter value 6 of the sixth cycle=cycle6_H-SFN*1024=5120;

Parameter value 7 of the seventh cycle=cycle7_H-SFN*1024=6144; and

Parameter value 8 of the eighth cycle=cycle8_H-SFN*1024=7168.

Further, assuming that one hyper frame includes four first durations (that is, M=4), and each first duration includes four paging occasions (that is, N=4), it may be determined according to the foregoing formula (4) that:

Offset 1 of the first cycle=((Parameter value 1)/1024)mod 4=0;

Offset 2 of the second cycle=((Parameter value 2)/1024)mod 4=1;

Offset 3 of the third cycle=((Parameter value 3)/1024)mod 4=2;

Offset 4 of the fourth cycle=((Parameter value 4)/1024)mod 4=3;

Offset 5 of the fifth cycle=((Parameter value 5)/1024)mod 4=0;

Offset 6 of the sixth cycle=((Parameter value 6)/1024)mod 4=1;

Offset 7 of the seventh cycle=((Parameter value 7)/1024)mod 4=2; and

Offset 8 of the eighth cycle=((Parameter value 8)/1024)mod 4=3.

It is assumed that there is one first target paging occasion.

The first offset in the formula (4) is used to indicate the location of the first target paging occasion in the N paging occasions in the $m^{th}$ first duration of the first cycle. In this case, the $1^{st}$ first duration (that is, m=1) in each hyper frame is used as an example, and a schematic distribution diagram of target paging occasions in each hyper frame is similar to that in FIG. 6, provided that the DRX cycle in FIG. 6 is replaced with a cycle whose cycle length is one hyper frame. Details are not described herein again.

Alternatively, it is assumed that there are a plurality of first target paging occasions (three paging occasions are used as an example for description herein). The first offset in the formula (4) is used to indicate a location of the first one of the first target paging occasions in the N paging occasions in the $m^{th}$ first duration of the first cycle.

In this case, the $1^{st}$ first duration (that is, m=1) in each hyper frame is used as an example, and a schematic distribution diagram of target paging occasions in each hyper frame is similar to that in FIG. 7, provided that the DRX cycle in FIG. 7 is replaced with a cycle whose cycle length is one hyper frame. Details are not described herein again.

Alternatively, it is assumed that there are a plurality of first target paging occasions (two paging occasions are used as an example for description herein). The first offset in the formula (4) is used to indicate a location of the last one of the first target paging occasions in the N paging occasions in the $m^{th}$ first duration of the first cycle.

In this case, the $1^{st}$ first duration (that is, m=1) in each hyper frame is used as an example, and a schematic distribution diagram of target paging occasions in each hyper frame is similar to that in FIG. 8, provided that the DRX cycle in FIG. 8 is replaced with a cycle whose cycle length is one hyper frame. Details are not described herein again.

Alternatively, it is assumed that the N-bit bitmap is 0110, where 0 indicates being not associated with the reference signal, and 1 indicates being associated with the reference signal (also, alternatively, it may also be that 0 indicates being associated with the reference signal, and 1 indicates being not associated with the reference signal, which is not limited herein).

In this case, the $1^{st}$ first duration (that is, m=1) in each hyper frame is used as an example, and a schematic distribution diagram of target paging occasions in each hyper frame is similar to that in FIG. 9, provided that the DRX cycle in FIG. 9 is replaced with a cycle whose cycle length is one hyper frame. Details are not described herein again.

Example 4

It is assumed that the first cycle length in this embodiment is equal to one hyper frame, the cycle of the reference signal is two hyper frames, and a sequence number of a hyper frame to which a $t^{th}$ cycle belongs is denoted as cycle(t)_H-SFN, where t is a positive integer. For example, a sequence number of a hyper frame to which the first cycle belongs is denoted as cycle1_H-SFN. In this case, it can be determined according to the foregoing formula (10) that:

Parameter value 1 of the first cycle=(cycle1_H-SFN*1024)mod 2048=0;

Parameter value 2 of the second cycle=(cycle2_H-SFN*1024)mod 2048=1024;

Parameter value 3 of the third cycle=(cycle3-H-SFN*1024)mod 2048=0;

Parameter value 4 of the fourth cycle=(cycle4-H-SFN*1024)mod 2048=1024;

Parameter value 5 of the fifth cycle=(cycle5-H-SFN*1024)mod 2048=0;

Parameter value 6 of the sixth cycle=(cycle6-H-SFN*1024)mod 2048=1024;

Parameter value 7 of the seventh cycle=(cycle7-H-SFN*1024)mod 2048=0; and

Parameter value 8 of the eighth cycle=(cycle8-H-SFN*1024)mod 2048=1024.

Further, assuming that one hyper frame includes four first durations (that is, M=4), and each first duration includes four paging occasions (that is, N=4), it may be determined according to the foregoing formula (4) that:

Offset 1 of the first cycle=((Parameter value 1)/1024)mod 4=0;

Offset 2 of the second cycle=((Parameter value 2)/1024)mod 4=1;

Offset 3 of the third cycle=((Parameter value 3)/1024)mod 4=0;

Offset 4 of the fourth cycle=((Parameter value 4)/1024)mod 4=1;

Offset 5 of the fifth cycle=((Parameter value 5)/1024)mod 4=0;

Offset 6 of the sixth cycle=((Parameter value 6)/1024)mod 4=1;

Offset 7 of the seventh cycle=((Parameter value 7)/1024)mod 4=0; and

Offset 8 of the eighth cycle=((Parameter value 8)/1024)mod 4=1.

It is assumed that there is one first target paging occasion.

The first offset in the formula (4) is used to indicate the location of the first target paging occasion in the N paging occasions in the $m^{th}$ first duration of the first cycle. In this case, the $1^{st}$ first duration (that is, m=1) in each hyper frame is used as an example, and a schematic distribution diagram of target paging occasions in each hyper frame is similar to that in FIG. 10, provided that the DRX cycle in FIG. 10 is replaced with a cycle whose cycle length is one hyper frame. Details are not described herein again. Further, in this example, if the cycle of the reference signal is four hyper frames, a schematic distribution diagram of finally determined target paging occasions in different hyper frames is similar to that in FIG. 6, provided that the DRX cycle in FIG. 6 is replaced with a cycle whose cycle length is one hyper frame. Details are not described herein again.

Alternatively, it is assumed that there are a plurality of first target paging occasions (three paging occasions are used as an example for description herein). The first offset in the formula (4) is used to indicate a location of the first one of the first target paging occasions in the N paging occasions in the $m^{th}$ first duration of the first cycle.

In this case, the $1^{st}$ first duration (that is, m=1) in each hyper frame is used as an example, and a schematic distribution diagram of target paging occasions in each hyper frame is similar to that in FIG. 11, provided that the DRX cycle in FIG. 11 is replaced with a cycle whose cycle length is one hyper frame. Details are not described herein again. Additionally, in this example, if the cycle of the reference signal is four hyper frames, a schematic distribution diagram of finally determined target paging occasions in different hyper frames is similar to that in FIG. 7, provided that the DRX cycle in FIG. 7 is replaced with a cycle whose cycle length is one hyper frame. Details are not described herein again.

Alternatively, it is assumed that there are a plurality of first target paging occasions (two paging occasions are used as an example for description herein). The first offset in the formula (4) is used to indicate a location of the last one of the first target paging occasions in the N paging occasions in the $m^{th}$ first duration of the first cycle.

In this case, the $1^{st}$ first duration (that is, m=1) in each hyper frame is used as an example, and a schematic distribution diagram of target paging occasions in each hyper frame is similar to that in FIG. 12, provided that the DRX cycle in FIG. 12 is replaced with a cycle whose cycle length is one hyper frame. Details are not described herein again. Further, in this example, if the cycle of the reference signal is four hyper frames, a schematic distribution diagram of finally determined target paging occasions in different hyper frames is similar to that in FIG. 8, provided that the DRX cycle in FIG. 8 is replaced with a cycle whose cycle length is one hyper frame. Details are not described herein again.

Alternatively, it is assumed that the N-bit bitmap is 0110, where 0 indicates being not associated with the reference signal, and 1 indicates being associated with the reference signal (alternatively, it may also be that 0 indicates being associated with the reference signal, and 1 indicates being not associated with the reference signal, which is not limited herein).

In this case, the $1^{st}$ first duration (that is, m=1) in each hyper frame is used as an example, and a schematic distribution diagram of target paging occasions in each hyper frame is similar to that in FIG. 13, provided that the DRX cycle in FIG. 13 is replaced with a cycle whose cycle length is one hyper frame. Details are not described herein again. Further, in this example, if the cycle of the reference signal is four hyper frames, a schematic distribution diagram of finally determined target paging occasions in different hyper frames is similar to that in FIG. 9, provided that the DRX cycle in FIG. 9 is replaced with a cycle whose cycle length is one hyper frame. Details are not described herein again.

In another possible implementation, the first offset is determined based on a first parameter value and N; and the first parameter value may be determined based on a cycle length of the reference signal, the first cycle length, and one or both of a sequence number of a frame from which the first cycle starts or a sequence number of a hyper frame to which the first cycle belongs.

For example, the first offset, the first parameter value, and N may satisfy the following formula (11):

$$\text{First offset} = (\text{First parameter value}) \bmod N \quad \text{Formula (11)}$$

where mod represents a modulo operation.

For example, assuming that the sequence number of the frame from which the first cycle starts is denoted as cycle_start_SFN, and the sequence number of the hyper frame to which the first cycle belongs is denoted as cycle_H-SFN, cycle_start_SFN satisfies: (cycle_start_SFN) mod (T1)=0, where T1 is the first cycle length. The first parameter value, the cycle length of the reference signal (which, for example, is denoted as T2), T1, and one or both of cycle_start_SFN or cycle_H-SFN may satisfy the following formula (12), formula (13), or formula (14):

$$\text{First parameter value} = ((\text{cycle\_}H\text{-SFN} * 1024 + \text{cycle\_start\_SFN}) \bmod (T2))/T1 \quad \text{Formula (12)}$$

$$\text{First parameter value} = ((\text{cycle\_start\_SFN}) \bmod (T2))/T1 \quad \text{Formula (13)}$$

$$\text{First parameter value} = ((\text{cycle\_}H\text{-SFN} * 1024) \bmod (T2))/T1 \quad \text{Formula (14)}$$

Additionally, in this embodiment, the terminal device and the network device may also determine, in the foregoing manner of determining the first target paging occasion that is in the $m^{th}$ first duration of the first cycle, the second target paging occasion that is in the $m^{th}$ first duration of the second cycle. Details are not described herein again.

The following provides descriptions with reference to several specific examples.

Example 5

It is assumed that in this embodiment, the first cycle and the second cycle are DRX cycles, and the DRX cycle includes 128 system frames (which may be referred to as frames). In this case, one hyper frame is equal to eight DRX cycles, which are denoted as the first DRX cycle, the second DRX cycle, ..., the $s^{th}$ DRX cycle, ..., and the eighth DRX cycle, where s is a positive integer. A sequence number of a frame from which the $s^{th}$ DRX cycle starts is denoted as cycle(s)_start_SFN. For example, a sequence number of a frame from which the first DRX cycle starts is denoted as cycle1_start_SFN. A sequence number of a hyper frame to which the $s^{th}$ DRX cycle belongs is denoted as cycle(s)_H-SFN. For example, a sequence number of a hyper frame to which the first DRX cycle belongs is denoted as cycle1_H-SFN. Herein, it is assumed that cycle1_H-SFN to cycle8_H-SFN are all 0, that is, hyper frames to which the first DRX cycle to the eighth DRX cycle belong are the first hyper frame, and the cycle of the reference signal is two DRX cycles, that is, 256 frames. In this case, it may be determined according to the foregoing formula (12) that:

Parameter value 1 of the first *DRX* cycle= ((cycle1_*H*-SFN*1024+cycle1_start_SFN)mod 256)/128=0;

Parameter value 2 of the second *DRX* cycle= ((cycle2_*H*-SFN*1024+cycle2_start_SFN)mod 256)/128=1;

Parameter value 3 of the third *DRX* cycle= ((cycle3_*H*-SFN*1024+cycle3_start_SFN)mod 256)/128=0;

Parameter value 4 of the fourth *DRX* cycle= ((cycle4_*H*-SFN*1024+cycle4_start_SFN)mod 256)/128=1;

Parameter value 5 of the fifth *DRX* cycle= ((cycle5_*H*-SFN*1024+cycle5_start_SFN)mod 256)/128=0;

Parameter value 6 of the sixth *DRX* cycle= ((cycle6_*H*-SFN*1024+cycle6_start_SFN)mod 256)/128=1;

Parameter value 7 of the seventh *DRX* cycle= ((cycle7_*H*-SFN*1024+cycle7_start_SFN)mod 256)/128=0; and Parameter value 8 of the eighth *DRX* cycle= ((cycle8_*H*-SFN*1024+cycle8_start_SFN)mod 256)/128=1.

Alternatively, it may be determined according to the foregoing formula (13) that:

Parameter value 1 of the first *DRX* cycle= ((cycle1_start_SFN)mod 256)/128=0;

Parameter value 2 of the second *DRX* cycle= ((cycle2_start_SFN)mod 256)/128=1;

Parameter value 3 of the third *DRX* cycle= ((cycle3_start_SFN)mod 256)/128=0;

Parameter value 4 of the fourth *DRX* cycle= ((cycle4_start_SFN)mod 256)/128=1;

Parameter value 5 of the fifth *DRX* cycle= ((cycle5_start_SFN)mod 256)/128=0;

Parameter value 6 of the sixth *DRX* cycle= ((cycle6_start_SFN)mod 256)/128=1;

Parameter value 7 of the seventh *DRX* cycle= ((cycle7_start_SFN)mod 256)/128=0; and Parameter value 8 of the eighth *DRX* cycle= ((cycle8_start_SFN)mod 256)/128=1.

Further, it is assumed that the first DRX cycle to the eighth DRX cycle each include four first durations (that is, M=4), and each first duration includes four paging occasions (that is, N=4). In this case, it may be determined according to the foregoing formula (11) that:

Offset 1 of the first *DRX* cycle=(Parameter value 1)mod 4=0;

Offset 2 of the second *DRX* cycle=(Parameter value 2)mod 4=1;

Offset 3 of the third *DRX* cycle=(Parameter value 3)mod 4=0;

Offset 4 of the fourth *DRX* cycle=(Parameter value 4)mod 4=1;

Offset 5 of the fifth *DRX* cycle=(Parameter value 5)mod 4=0;

Offset 6 of the sixth *DRX* cycle=(Parameter value 6)mod 4=1;

Offset 7 of the seventh *DRX* cycle=(Parameter value 7)mod 4=0; and

Offset 8 of the eighth *DRX* cycle=(Parameter value 8)mod 4=1.

After the offset is determined, for a schematic distribution diagram of target paging occasions in each DRX cycle, refer to the examples shown in FIG. 10 to FIG. 13. Details are not described herein again.

Example 6

It is assumed that the first cycle length in this embodiment is equal to one hyper frame, the cycle of the reference signal is two hyper frames, and a sequence number of a hyper frame to which a $t^{th}$ cycle belongs is denoted as cycle(t)_H-SFN, where t is a positive integer. For example, a sequence number of a hyper frame to which the first cycle belongs is denoted as cycle1_H-SFN. In this case, it can be determined according to the foregoing formula (14) that:

Parameter value 1 of the first cycle=((cycle1_*H*-SFN*1024)mod 2048)/1024=0;

Parameter value 2 of the second cycle=((cycle2_*H*-SFN*1024)mod 2048)/1024=1;

Parameter value 3 of the third cycle=((cycle3_*H*-SFN*1024)mod 2048)/1024=0;

Parameter value 4 of the fourth cycle=((cycle4_*H*-SFN*1024)mod 2048)/1024=1;

Parameter value 5 of the fifth cycle=((cycle5_*H*-SFN*1024)mod 2048)/1024=0;

Parameter value 6 of the sixth cycle=((cycle6_*H*-SFN*1024)mod 2048)/1024=1;

Parameter value 7 of the seventh cycle=((cycle7_*H*-SFN*1024)mod 2048)/1024=0; and Parameter value 8 of the eighth cycle=((cycle8_*H*-SFN*1024)mod 2048)/1024=1.

Further, assuming that one hyper frame includes four first durations (that is, M=4), and each first duration includes four paging occasions (that is, N=4), it may be determined according to the foregoing formula (11) that:

Offset 1 of the first cycle=(Parameter value 1)mod 4=0;

Offset 2 of the second cycle=(Parameter value 2)mod 4=1;

Offset 3 of the third cycle=(Parameter value 3)mod 4=0;

Offset 4 of the fourth cycle=(Parameter value 4)mod 4=1;

Offset 5 of the fifth cycle=(Parameter value 5)mod 4=0;

Offset 6 of the sixth cycle=(Parameter value 6)mod 4=1;

Offset 7 of the seventh cycle=(Parameter value 7)mod 4=0; and

Offset 8 of the eighth cycle=(Parameter value 8)mod 4=1.

After the offset is determined, a schematic distribution diagram of target paging occasions in each hyper frame is similar to that in the examples shown in FIG. 10 to FIG. 13, provided that the DRX cycle in FIG. 10 to FIG. 13 is replaced with a cycle whose cycle length is one hyper frame. Details are not described herein again.

It should be noted that, in this embodiment, the first offset determined according to the formula (11) may also be understood as a relative sequence number of the first cycle within the cycle of the reference signal. This is uniformly described herein, and details are not further described below.

Optionally, in this embodiment, if the first offset, the first parameter value, and N may satisfy the foregoing formula (11), a paging frame number may also be considered when the first offset is determined. For example, a paging frame of the paging frame number may be a paging frame to which a $q^{th}$ PO in the first duration belongs, for example, q=1. This is not limited in this embodiment.

Optionally, in this embodiment, that the first offset is determined based on a first parameter value and N may include: the first offset is determined based on the first parameter value, N, and a pseudo-random sequence.

For example, the first offset, the first parameter value, the pseudo-random sequence, and N may satisfy the following formula (15):

First offset=$f$(Pseudo-random sequence)mod $N$    Formula (15)

where mod represents a modulo operation, the pseudo-random sequence is a pseudo-random sequence related to the first parameter value, and f(pseudo-random sequence) is a function determined by the pseudo-random sequence.

For example, the pseudo-random sequence herein may be, for example, a Gold sequence.

In a possible implementation, in this embodiment, a method for determining the pseudo-random sequence based on the first parameter value may be: initializing the pseudo-random sequence by using the first parameter value and obtaining a value of one or more fixed bits in the pseudo-random sequence. For example, an initialization seed of a Gold sequence may be set to the first parameter value, and then a value of a fixed-bit pseudo-random sequence is taken.

In another possible implementation, in this embodiment, a method for determining the pseudo-random sequence based on the first parameter value may be: performing initialization by using a fixed value and obtaining a value at a location of the first parameter value in the pseudo-random sequence. For example, an initialization seed of a Gold sequence is set to 35, and then the value at the location of the first parameter value in the pseudo-random sequence is taken.

Because f(pseudo-random sequence) is a random value, the first offset obtained according to the formula (15) is a random value from 0 to N−1. Assuming that first parameter values corresponding to different cycles are different, if a first parameter value is a relative sequence number of a current DRX cycle in a reference signal cycle, values obtained according to f(pseudo-random sequence) in different DRX cycles are different in a reference signal cycle, and then offsets obtained according to the formula (15) are different. Therefore, locations of target paging occasions in the $m^{th}$ first duration are different. The target paging occasion is associated with the reference signal, and the terminal device monitors only one paging occasion in each DRX cycle. Therefore, when paging occasions monitored by different terminal devices are different, in a plurality of different DRX cycles, the paging occasions monitored by the different terminal devices each have an opportunity to be associated with a reference signal in one of the DRX cycles, and a case in which paging occasions monitored by some terminal devices do not have an associated reference signal is avoided. Therefore, this solution is fairer to a plurality of terminal devices.

It should be noted that, in the foregoing embodiments, a manner of determining target paging occasions in $m^{th}$ first durations of different cycles is used as an example for description. In the foregoing manner, relative locations of target paging occasions determined in different first duration of a same cycle are the same. Further, in another manner, relative locations of target paging occasions determined in different first durations of a same cycle may be different. For example, the reference signal cycle includes a large quantity of sets of N POs, and the first offset is a relative sequence number of a set of N POs in the reference signal cycle. This is not limited in this embodiment.

Optionally, in this embodiment, the time domain resource in the $m^{th}$ first duration may include, for example, at least one of a subframe corresponding to each paging occasion in the first target paging occasions, X1 subframes before the subframe corresponding to each paging occasion, or Y1 subframes after the subframe corresponding to each paging occasion. The X1 subframes may be first X1 (consecutive) subframes in Z1 subframes that are before the subframe corresponding to each paging occasion, where Z1 may be notified by the network device, or may be agreed upon in a protocol. For example, it is agreed in the protocol that Z1 is equal to 10. The Y1 subframes may be last Y1 consecutive subframes that are after the subframe corresponding to each paging occasion. X1 and Y1 may be notified by the network device, or may be agreed upon in a protocol. A sum of X1 and Y1 may be related to a value of nB, and nB represents a quantity of paging occasions in the discontinuous reception cycle. In addition, it should be noted that, in this embodiment, in the first target paging occasions, the X1 subframes before the subframe corresponding to each paging occasion or the Y1 subframes after the subframe corresponding to each paging occasion may be in the $m^{th}$ first duration, or may not be in the $m^{th}$ first duration. For example, in the first target paging occasions, the X1 subframes before the subframe corresponding to each paging occasion are in the $(m-m1)^{th}$ first duration, and the Y1 subframes after the subframe corresponding to each paging occasion are in the $(m-m2)^{th}$ first duration, where both m1 and m2 are integers. This is not limited in this embodiment.

In the reference signal receiving and sending method provided in this embodiment, on a non-anchor carrier, the reference signal is still sent when there is no paging scheduling message on an NPDCCH, and the relative location, in the first cycle, of the first target paging occasion that is in the $m^{th}$ first duration of the first cycle associated with the reference signal is different from the relative location, in the second cycle, of the second target paging occasion that is in the $m^{th}$ first duration of the second cycle. From a perspective of the terminal device, because one paging occasion is monitored in each discontinuous reception cycle, locations of paging occasions monitored by different terminal devices may be different. Therefore, according to this solution, when paging occasions monitored by different terminal devices are different, in a plurality of different discontinuous reception cycles, the paging occasions monitored by the different terminal devices each have an opportunity to be associated with a reference signal in one of the discontinuous reception cycles, and a case in which paging occasions monitored by some terminal devices do not have an associated reference signal is avoided. Therefore, this solution is fairer to a plurality of terminal devices.

The processor 301 in the network device 30 shown in FIG. 3 may invoke application program code stored in the memory 302, to indicate the network device to perform the actions performed by the network device in steps S501 to S505. The processor 401 in the terminal device 40 shown in FIG. 3 may invoke the application program code stored in the memory 402, to indicate the network device to perform the actions performed by the terminal device in steps S501 to S505. This is not limited in this embodiment.

It should be noted that this embodiment is described by using an example in which a paging occasion is associated with a reference signal. Further, a wakeup signal (wakeup signal, WUS) may also be used to associate a reference signal. In this case, a corresponding method for receiving and sending reference signal is similar to that in the foregoing method embodiment. For example, a first target WUS in an $m^{th}$ first duration of a first cycle may be determined in the foregoing manner of determining the first target paging occasion in the $m^{th}$ first duration of the first cycle, and after a time domain resource in the $m^{th}$ first duration of the first cycle is determined based on the first WUS, the reference signal is received or sent on a corresponding time-frequency resource. Details are not described herein.

Optionally, in this embodiment, the time domain resource in the $m^{th}$ first duration may include, for example, at least one of a start subframe of each WUS in first WUSs, X2 subframes before the start subframe of each WUS, or Y2 subframes after the start subframe of each WUS. The X2 subframes may be first X2 (consecutive) subframes in Z2 subframes that are before the start subframe of each WUS, where Z2 may be notified by the network device, or may be agreed upon in a protocol. For example, it is agreed in the protocol that Z2 is equal to 10. The Y2 subframes may be last Y2 consecutive subframes that are after the start subframe of each WUS. X2 and Y2 may be notified by the network device, or may be agreed upon in a protocol. A sum of X2 and Y2 may be related to a value of nB, and nB represents a quantity of paging occasions in the discontinuous reception cycle.

Optionally, in the foregoing embodiment, an NRS may be sent around a PO subset in one DRX cycle. To resolve a fairness problem, a PO subset (where one of the N POs is selected) in a different DRX cycle is different. Therefore, how to determine the PO subset may be related to some paging configuration parameters. Existing paging configuration parameters include a paging density (nB) and a length (T) of a DRX cycle. When the paging density (nB) is greater than a first value, N may be greater than a second value. This is because two POs are very close to each other in this case. When the paging density (nB) is less than a third value, N may be less than a fourth value, or even a value of N may be 1. This is because two POs are far away from each other in this case, where N is a positive integer. When the length (T) of the DRX cycle is greater than a fifth value, for example, T is greater than 5.12 s, N may be less than a sixth value. When the length (T) of the DRX cycle is less than a seventh value, for example, T=1.28 s, N may be greater than an eighth value. Further, a value of N may also be related to both the paging density (nB) and the length (T) of the DRX cycle. This is not limited in this embodiment.

Optionally, in the foregoing embodiment, different POs may be associated with different quantities and/or locations of NRSs. For example, some POs are associated with a specific quantity of NRSs before the POs, some POs are associated with a specific quantity of NRSs after the POs, some POs are associated with a large quantity of NRSs, and some POs are associated with a small quantity of NRSs. Such an NRS sending method may be written in a protocol, or may be configured by using a network. This is not limited in this embodiment.

In addition, the existing NB-IoT has three deployment modes: in-band operation, guard-band operation, and stand-alone operation. The in-band operation mode is further classified into in-band same-physical cell identifier (PCI) and in-band different-PCI. In a case of the in-band same-PCI, a terminal device in an NB-IoT system may assume that the NB-IoT system and an LTE system have a same PCI, may assume that an LTE cell reference signal (CRS) and an NRS have a same quantity of antenna ports, and may assume that LTE CRSs are always available in all NB-IoT downlink subframes in which NRS transmission exists. That is, in the case of the in-band same-PCI, when an NRS exists in a subframe, the network device needs to send a CRS in a corresponding subframe.

In the current technology, to enable a terminal device that is easily covered to terminate PDCCH detection in advance, a network device may send some NRSs to the terminal device on a non-anchor carrier. In this case, in the case of the in-band same-PCI, the network device not only needs to additionally send an NRS on some resources, but also needs to additionally send a CRS on these resources. In this case, for the network device, not only power of the network device is wasted, but also LTE resource scheduling may be affected, causing more interference to another cell. In addition, because the CRS and the NRS are located on different symbols in one subframe, sending both the CRS and the NRS is unfavorable to power-off of the network device for a symbol-level resource. To resolve the foregoing problem, the embodiments provide the following solutions.

Figure 16:
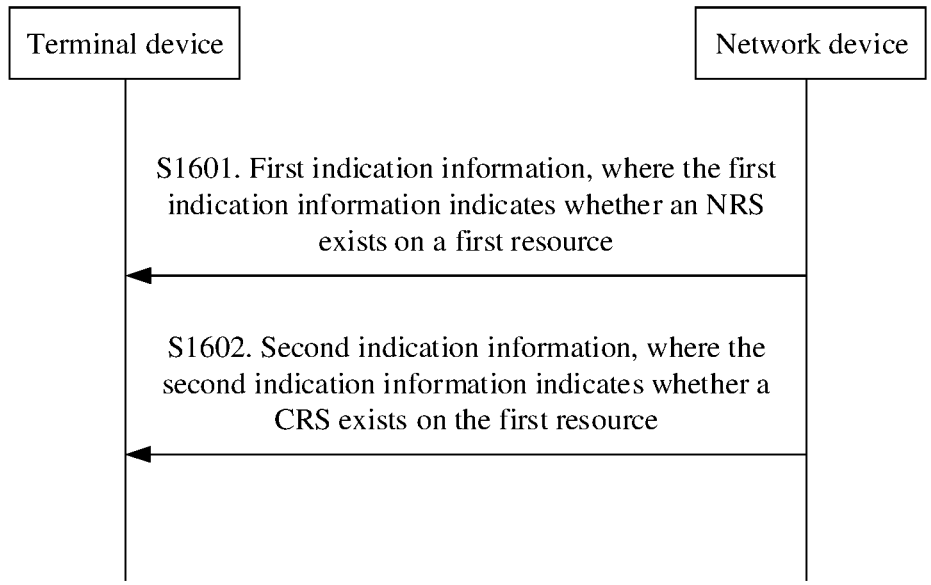
FIG. 16 shows another reference signal receiving and sending method according to an embodiment.

In a possible implementation, in the case of the in-band same-PCI, the terminal device determines, by using a signaling indication, whether a CRS exists in a subframe without an NRS. For example, FIG. 16 shows a reference signal receiving and sending method according to an embodiment. The method includes the following steps.

S1601. A network device sends first indication information to a terminal device, and the terminal device receives the first indication information from the network device. The first indication information is used to indicate whether an NRS exists on a first resource.

Optionally, the first indication information in this embodiment may be carried in a system information block (SIB)

message or a radio resource control (RRC) message. This is not limited in this embodiment.

S1602. If the first indication information indicates that no NRS exists on the first resource, the network device sends second indication information to the terminal device, and the terminal device receives the second indication information from the network device. The second indication information is used to indicate whether a CRS exists on the first resource.

In other words, in this embodiment, from a perspective of the network device, the second indication information exists only when a deployment mode of a non-anchor carrier is in-band same-PCI and the first indication information indicates that no NRS exists on the first resource.

Optionally, when a first reference signal is configured, a second reference signal is definitely configured. Therefore, in this embodiment, if the first indication information indicates that the NRS exists on the first resource, the network device may send the NRS and the CRS to the terminal device on the first resource, and the terminal device may learn, based on the first indication information, that the NRS and the CRS exist on the first resource. Further, the terminal device receives, on the first resource, the NRS and the CRS from the network device. This is uniformly described herein, and details are not further described below.

Optionally, the second indication information in this embodiment may be carried in a SIB message or an RRC message. This is not limited in this embodiment. In addition, in this embodiment, the first indication information and the second indication information are carried by using a same message or may be carried by using different messages. Manners or locations of carrying the first indication information and the second indication information are not limited in this embodiment.

Optionally, in this embodiment, the first indication information and the second indication information may be configured at a carrier level, that is, the first indication information and the second indication information are separately configured for each carrier. Alternatively, the first indication information and the second indication information may be configured at a cell level, that is, the first indication information and the second indication information are configured for a cell. Alternatively, the first indication information may be configured at a cell level, and the second indication information may be configured at a carrier level. Alternatively, the first indication information may be configured at a carrier level, and the second indication information may be configured at a cell level. This is not limited in this embodiment.

In this embodiment, if the second indication information indicates that the CRS exists on the first resource, the network device may send only the CRS to the terminal device on the first resource, and the terminal device may learn, based on the first indication information and the second indication information, that there is only the CRS on the first resource. Further, the terminal device receives the CRS from the network device on the first resource. Alternatively, if the second indication information indicates that no CRS exists on the first resource, the network device can send neither the NRS nor the CRS on the first resource, and the terminal device may learn, based on the first indication information and the second indication information, that neither the CRS nor the NRS exists on the first resource. This is uniformly described herein, and details are not further described below.

That is, in this embodiment, in the case of the in-band same-PCI, when the network device needs to simultaneously send the NRS and the CRS, because when the NRS is configured, the CRS is definitely configured, both the NRS and the CRS may be indicated by using the indication information used to indicate NRS. In other words, the network device may indicate, by using the first indication information, that the NRS and the CRS exist on the first resource. Alternatively, the network device may indicate, by using the first indication information used to indicate the NRS and the second indication information used to indicate the CRS, that there is neither an NRS nor a CRS on the first resource, or that there is only a CRS on the first resource. Based on this solution, the CRS and the NRS can be flexibly configured. For example, in the in-band same-PCI case, the network device may send only the CRS on the first resource, thereby avoiding various problems such as a waste of power of the network device, impact on LTE resource scheduling, and a disadvantage of power shutdown of the network device for a symbol-level resource and that are in the current technology and that are caused by additionally sending the CRS on some resources and additionally sending the NRS on these resources.

Optionally, the embodiment shown in FIG. 16 is described by using in-band same-PCI as an example. For another deployment mode, the network device may send the first indication information to indicate whether an NRS and a CRS exist on the first resource. When the first indication information indicates that no NRS exists on the first resource, neither the NRS nor the CRS exists on the first resource. This is not limited in this embodiment.

Optionally, an example in which the network device first sends the first indication information to the terminal, and then sends the second indication information to the terminal device is used for description in the embodiment shown in FIG. 16. The second indication information exists when the deployment mode of the non-anchor carrier is in-band same-PCI and the first indication information indicates that no NRS exists on the first resource. Further, an existence condition of the second indication information does not depend on content indicated by the first indication information, and the first indication information and the second indication information may exist independently. In other words, the network device sends the first indication information to the terminal device, where the first indication information is used to indicate whether an NRS exists on the first resource. In addition, the network device sends the second indication information to the terminal device, where the second indication information is used to indicate whether a CRS exists on the first resource. This scenario is not described in detail in this embodiment.

Figure 17:
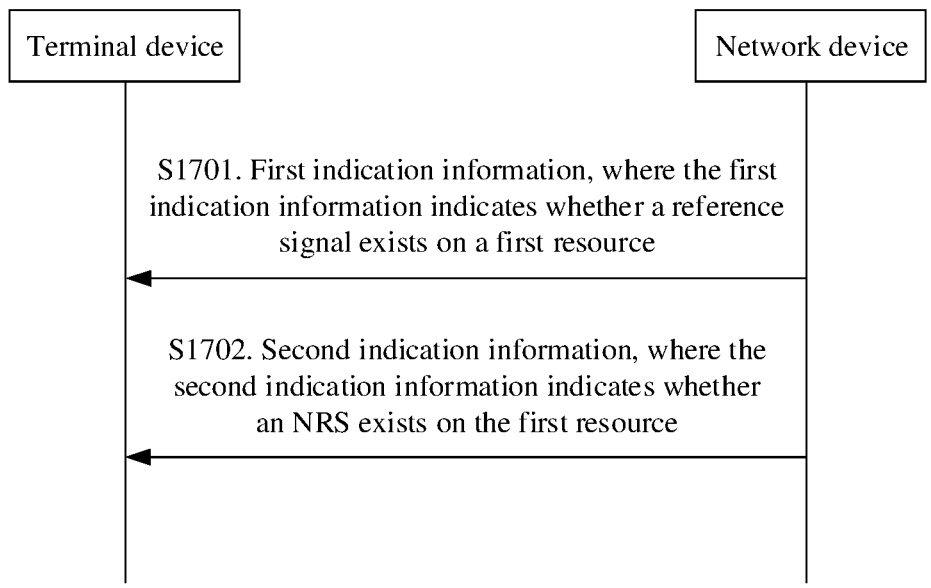
FIG. 17 shows still another reference signal receiving and sending method according to an embodiment.

Alternatively, in another possible implementation, in the case of the in-band same-PCI, the terminal device determines, by using a signaling indication, whether a reference signal on the first resource is an NRS and a CRS, or whether the reference signal on the first resource is a CRS. For example, FIG. 17 shows another reference signal receiving and sending method according to an embodiment. The method includes the following steps.

S1701. A network device sends first indication information to a terminal device, and the terminal device receives the first indication information from the network device. The first indication information is used to indicate whether a reference signal exists on a first resource.

Optionally, the first indication information in this embodiment may be carried in a SIB message or an RRC message. This is not limited in this embodiment.

Optionally, the reference signal in this embodiment includes but is not limited to an NRS and/or a CRS. This is uniformly described herein, and details are not further described below.

S1702. If the first indication information indicates that a reference signal exists on the first resource, the network device sends second indication information to the terminal device, and the terminal device receives the second indication information from the network device. The second indication information is used to indicate whether an NRS exists on the first resource.

In other words, in this embodiment, from a perspective of the network device, the second indication information exists only when a deployment mode of a non-anchor carrier is in-band same-PCI and the first indication information indicates that a reference signal exists on the first resource.

Optionally, in this embodiment, if the first indication information indicates that no reference signal exists on the first resource, the network device can send neither an NRS nor a CRS on the first resource, and the terminal device can also learn, based on the first indication information, that no reference signal exists on the first resource. This is uniformly described herein, and details are not further described below.

Optionally, the second indication information in this embodiment may be carried in a SIB message or an RRC message. This is not limited in this embodiment. In addition, in this embodiment, the first indication information and the second indication information are carried by using a same message or may be carried by using different messages. Manners or locations of carrying the first indication information and the second indication information are not limited in this embodiment.

Optionally, in this embodiment, the first indication information and the second indication information may be configured at a carrier level, that is, the first indication information and the second indication information are separately configured for each carrier. Alternatively, the first indication information and the second indication information may be configured at a cell level, that is, the first indication information and the second indication information are configured for a cell. Alternatively, the first indication information may be configured at a cell level, and the second indication information may be configured at a carrier level. Alternatively, the first indication information may be configured at a carrier level, and the second indication information may be configured at a cell level. This is not limited in this embodiment.

In this embodiment, when the NRS is configured, the CRS is definitely configured. Therefore, if the second indication information indicates that the NRS exists on the first resource, the network device may send the NRS and the CRS to the terminal device on the first resource, and the terminal device may learn, based on the second indication information, that the NRS and the CRS exist on the first resource. Further, the terminal device can receive the NRS and the CRS from the network device on the first resource. Alternatively, if the second indication information indicates that no NRS exists on the first resource, the network device may send only the CRS to the terminal device on the first resource, and the terminal device can learn, based on the first indication information and the second indication information, that there is only the CRS on the first resource. Further, the terminal device receives the CRS from the network device on the first resource. This is uniformly described herein, and details are not further described below.

In other words, in this embodiment, when the network device does not need to send a reference signal in an in-band same-PCI case, the network device may indicate, by using the first indication information, that no reference signal exists on the first resource. Alternatively, when the network device needs to simultaneously send the NRS and the CRS, because when the NRS is configured, the CRS is definitely configured, both the NRS and the CRS may be indicated by using the indication information used to indicate NRS. In other words, the network device may indicate, by using the first indication information and the second indication information, that the NRS and the CRS exist on the first resource. Alternatively, when the network device does not need to send the NRS but needs to send the CRS, if the second indication information indicates that the NRS does not exist on the first resource, that is, indicates only the CRS exists on the first resource, the first indication information and the second indication information may be used to indicate that only the CRS exists on the first resource. Based on this solution, the CRS and the NRS can be flexibly configured. For example, in the in-band same-PCI case, the network device may send only the CRS on the first resource, thereby avoiding various problems such as a waste of power of the network device, impact on LTE resource scheduling, and a disadvantage of power shutdown of the network device for a symbol-level resource and that are in the current technology and that are caused by additionally sending the CRS on some resources and additionally sending the NRS on these resources.

The embodiment shown in FIG. 17 is described by using in-band same-PCI as an example. For another deployment mode, the network device may send the first indication information to indicate whether an NRS and a CRS exist on the first resource. When the first indication information indicates that no reference signal exists on the first resource, neither the NRS nor the CRS exists on the first resource. This is not limited in this embodiment.

Optionally, the embodiment shown in FIG. 17 is described by using an example in which the network device first sends the first indication information to the terminal, and then sends the second indication information to the terminal device. Further, the network device may not need to indicate, to the terminal device, that the reference signal is not sent. In other words, the network device may not need to send the first indication information to the terminal device, but only needs to send the second indication information to the terminal device, so that the terminal device learns, based on the second indication information, whether an NRS exists on the first resource. If the second indication information indicates that the NRS exists on the first resource, the terminal device may learn that the NRS and the CRS exist on the first resource. Otherwise, if the second indication information indicates that the NRS does not exist on the first resource, the terminal device may learn that only the CRS exists on the first resource. For related descriptions, refer to the embodiment shown in FIG. 17. This scenario is not described in detail in this embodiment.

Optionally, in the embodiment shown in FIG. 16 or FIG. 17, during implementation, the terminal device or the network device may first calculate the first resource on which an NRS may exist, where the NRS is used to enable a terminal device that is easily covered to terminate PDCCH detection in advance, and then determine whether the NRS and a CRS are sent on the first resource or only a CRS is sent on the first resource (that is, determine whether to send the NRS). Alternatively, during implementation, the terminal device or the network device may first determine whether the NRS and a CRS are sent on the first resource or only a CRS is sent on the first resource (that is, determine whether to send the NRS), and then calculate the first resource on which an NRS may exist. Whether the first resource is first determined or the type of the reference signal on the first resource is first determined is not limited in this embodiment.

Optionally, in the embodiment shown in FIG. 16 or FIG. 17, the first resource may be a time-frequency resource for sending the reference signal in the foregoing embodiment, or may be another time-frequency resource. This is not limited in this embodiment.

It may be understood that "*" in the foregoing embodiment represents a multiplication operation, which is uniformly described herein.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments from a perspective of interaction between the network elements. Correspondingly, an embodiment further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It can be understood that, to implement the foregoing functions, the communication apparatus includes a corresponding hardware structure and/or software module for performing the functions. A person of ordinary skill in the art should easily be aware that, in combination with the examples described in the embodiments, units and algorithm steps may be implemented by hardware or a combination of hardware and computer software in the embodiments. Whether a function is performed by hardware or hardware driven by computer software depends on particular applications and design constraints of the solutions. A person of ordinary skill in the art may use different methods to implement the described functions for each particular application, but it should not be considered that such an implementation goes out of the scope.

In the embodiments, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in the embodiments, division into the modules is an example and is merely logical function division and may be other division in an actual implementation.

Figure 14:
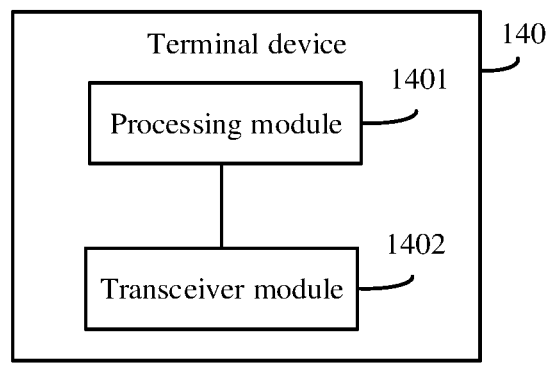
FIG. 14 is still another schematic structural diagram of a terminal device according to an embodiment.

For example, the communication apparatus is the terminal device in the foregoing method embodiments. FIG. 14 is a schematic structural diagram of a terminal device 140. The terminal device 140 includes a processing module 1401 and a transceiver module 1402. The transceiver module 1402 may also be referred to as a transceiver unit, and is configured to implement a sending and/or receiving function, for example, may be a transceiver circuit, a transceiver machine, a transceiver, or a communication interface.

In a possible implementation, the terminal device 140 is used in a plurality of cycles whose cycle lengths are a first cycle length, the plurality of cycles include a first cycle and a second cycle, the first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1.

The processing module 1401 is configured to determine a first target paging occasion that is in an $m^{th}$ first duration of the first cycle, where a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M. The processing module 1401 is further configured to determine, based on the first target paging occasion, a time domain resource that is in the $m^{th}$ first duration of the first cycle, where the time domain resource is a time domain resource of a time-frequency resource used to transmit a reference signal. The transceiver module 1402 is configured to receive, on the time-frequency resource, the reference signal that is from a network device.

Optionally, that the processing module 1401 is configured to determine a first target paging occasion that is in an $m^{th}$ first duration of the first cycle includes: the processing module is configured to: determine a first offset, where the first offset is used to indicate a location of the first target paging occasion in N paging occasions in the $m^{th}$ first duration of the first cycle; and determine, based on the first offset, the first target paging occasion that is in the $m^{th}$ first duration of the first cycle.

Optionally, that the processing module 1401 is configured to determine, based on the first offset, the first target paging occasion that is in the $m^{th}$ first duration of the first cycle includes: the processing module is configured to: if there are a plurality of first target paging occasions, determine, based on the first offset, the first one of the first target paging occasions that are in the $m^{th}$ first duration of the first cycle.

Optionally, the transceiver module 1402 is further configured to receive an N-bit bitmap from the network device, where each bit in the bitmap is used to indicate whether each of the N paging occasions is associated with the reference signal. That the processing module 1401 is configured to determine, based on the first offset, the first target paging occasion that is in the $m^{th}$ first duration of the first cycle includes: the processing module is configured to determine, based on the bitmap and the first offset, the first target paging occasion that is in the $m^{th}$ first duration of the first cycle.

Optionally, that the processing module 1401 is configured to determine, based on the first offset, the first target paging occasion that is in the $m^{th}$ first duration of the first cycle includes: the processing module is configured to: determine an index of a paging occasion that is in the $m^{th}$ first duration of the first cycle; determine, in the index of the paging occasion in the $m^{th}$ first duration of the first cycle, an index of the first target paging occasion that is in the $m^{th}$ first duration of the first cycle based on the first offset; and determine the first target paging occasion based on the index of the first target paging occasion.

Optionally, that the processing module 1401 is configured to determine a first target paging occasion that is in an $m^{th}$ first duration of the first cycle may include: the processing module is configured to determine a second parameter value based on R, PO_Index, and N, where the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs.

In another possible implementation, the transceiver module 1402 is configured to receive first indication information from a network device, where the first indication information is used to indicate whether a first reference signal exists on a first resource. The transceiver module 1402 is further configured to: if the processing module 1401 determines that the first indication information indicates that the first reference signal does not exist on the first resource, receive second indication information from the network device, where the second indication information is used to indicate whether a second reference signal exists on the first resource. For example, the first reference signal herein may be, for example, a narrowband reference signal, and the second reference signal herein may be, for example, a cell-specific reference signal.

In still another possible implementation, the transceiver module 1402 is configured to receive first indication information from a network device, where the first indication information is used to indicate whether a reference signal exists on a first resource. The transceiver module 1402 is further configured to: if the processing module 1401 determines that the first indication information indicates that the reference signal exists on the first resource, receive second indication information from the network device, where the second indication information is used to indicate whether a first reference signal exists on the first resource. For example, the first reference signal herein may be, for example, a narrowband reference signal.

All related content of the steps in the foregoing method embodiments may be cited in function descriptions of a corresponding functional module, and details are not described herein again.

In this embodiment, the terminal device 140 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device 140 may be in a form of the terminal device 40 shown in FIG. 3.

For example, the processor 401 in the terminal device 40 shown in FIG. 3 may invoke the computer-executable instructions stored in the memory 402, to enable the terminal device 40 to perform the reference signal receiving and sending method in the foregoing method embodiments.

For example, the processor 401 in the terminal device 40 shown in FIG. 3 may invoke the computer-executable instructions stored in the memory 402, to implement functions/implementation processes of the processing module 1401 and the transceiver module 1402 in FIG. 14. Alternatively, the processor 401 in the terminal device 40 shown in FIG. 3 may invoke the computer-executable instructions stored in the memory 402, to implement functions/implementation processes of the processing module 1401 in FIG. 14, and the transceiver 403 in the terminal device 40 shown in FIG. 3 may implement functions/implementation processes of the transceiver module 1402 in FIG. 14.

The terminal device 140 provided in this embodiment can perform the foregoing reference signal receiving and sending method. Therefore, for a effect that can be achieved by the terminal device, refer to the foregoing method embodiments. Details are not described herein again.

Figure 15:
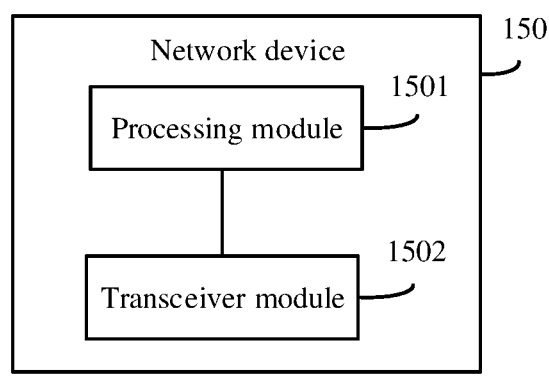
FIG. 15 is still another schematic structural diagram of a network device according to an embodiment.

Alternatively, for example, the communication apparatus is the network device in the foregoing method embodiments. FIG. 15 is a schematic structural diagram of a network device 150. The network device 150 includes a processing module 1501 and a transceiver module 1502. The transceiver module 1502 may also be referred to as a transceiver unit, and is configured to implement a sending and/or receiving function, for example, may be a transceiver circuit, a transceiver machine, a transceiver, or a communication interface.

In a possible implementation, the network device 150 is used in a plurality of cycles whose cycle lengths are a first cycle length, the plurality of cycles include a first cycle and a second cycle, the first cycle and the second cycle each include M first durations, the first duration includes N paging occasions, and location distribution of paging occasions in the first cycle is the same as location distribution of paging occasions in the second cycle, where M is a positive integer, and N is a positive integer greater than 1.

The processing module 1501 is configured to determine a first target paging occasion that is in an $m^{th}$ first duration of the first cycle, where a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M. The processing module 1501 is further configured to determine, based on the first target paging occasion, a time domain resource that is in the $m^{th}$ first duration of the first cycle, where the time domain resource is a time domain resource of a time-frequency resource used to transmit a reference signal. The transceiver module 1502 is configured to send the reference signal to a terminal device on the time-frequency resource.

Optionally, that the processing module 1501 is configured to determine a first target paging occasion that is in an $m^{th}$ first duration of the first cycle includes: the processing module is configured to: determine a first offset, where the first offset is used to indicate a location of the first target paging occasion in N paging occasions in the $m^{th}$ first duration of the first cycle; and determine, based on the first offset, the first target paging occasion that is in the $m^{th}$ first duration of the first cycle.

Optionally, that the processing module 1501 is configured to determine, based on the first offset, the first target paging occasion that is in the $m^{th}$ first duration of the first cycle includes: the processing module is configured to: if there are a plurality of first target paging occasions, determine, based on the first offset, the first one of the first target paging occasions that are in the $m^{th}$ first duration of the first cycle.

Optionally, the transceiver module 1502 is further configured to send an N-bit bitmap to the terminal device, where each bit in the bitmap is used to indicate whether each of the N paging occasions is associated with the reference signal.

That the processing module 1501 is configured to determine, based on the first offset, the first target paging occasion that is in the $m^{th}$ first duration of the first cycle includes: the processing module is configured to determine, based on the bitmap and the first offset, the first target paging occasion that is in the $m^{th}$ first duration of the first cycle.

Optionally, that the processing module 1501 is configured to determine, based on the first offset, the first target paging occasion that is in the $m^{th}$ first duration of the first cycle includes: the processing module is configured to: determine an index of a paging occasion that is in the $m^{th}$ first duration of the first cycle; determine, in the index of the paging occasion in the $m^{th}$ first duration of the first cycle, an index of the first target paging occasion that is in the $m^{th}$ first duration of the first cycle based on the first offset; and determine the first target paging occasion based on the index of the first target paging occasion.

Optionally, that the processing module 1501 is configured to determine a first target paging occasion that is in an $m^{th}$ first duration of the first cycle may include: determine a second parameter value based on R, PO_Index, and N, where the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs.

In another possible implementation, the transceiver module 1502 is configured to send first indication information to a terminal device, where the first indication information is used to indicate whether a first reference signal exists on a first resource. The transceiver module 1502 is further configured to: if the processing module 1501 determines that the first indication information indicates that the first reference signal does not exist on the first resource, send second indication information to the terminal device, where the second indication information is used to indicate whether a second reference signal exists on the first resource. For example, the first reference signal herein may be, for example, a narrowband reference signal (NRS), and the second reference signal herein may be, for example, a cell-specific reference signal (CRS).

In still another possible implementation, the transceiver module 1502 is configured to send first indication information to a terminal device, where the first indication information is used to indicate whether a reference signal exists on a first resource. The transceiver module 1502 is further configured to: if the processing module 1501 determines that the first indication information indicates that the reference signal exists on the first resource, send second indication information to the terminal device, where the second indication information is used to indicate whether a first reference signal exists on the first resource. For example, the first reference signal herein may be, for example, a narrowband reference signal NRS.

All related content of the steps in the foregoing method embodiments may be cited in function descriptions of a corresponding functional module, and details are not described herein again.

In this embodiment, the network device 150 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network device 150 may be in a form of the network device 30 shown in FIG. 3.

For example, the processor 301 in the network device 30 shown in FIG. 3 may invoke computer-executable instructions stored in the memory 302, to enable the network device 30 to perform the reference signal receiving and sending method in the foregoing method embodiments.

For example, the processor 301 in the network device 30 shown in FIG. 3 may invoke the computer-executable instructions stored in the memory 302, to implement functions/implementation processes of the processing module 1501 and the transceiver module 1502 in FIG. 15. Alternatively, the processor 301 in the network device 30 shown in FIG. 3 may invoke the computer-executable instructions stored in the memory 302, to implement functions/implementation processes of the processing module 1501 in FIG. 15, and the transceiver 303 in the network device 30 shown in FIG. 3 may implement functions/implementation processes of the transceiver module 1502 in FIG. 15.

The network device 150 provided in this embodiment can perform the foregoing reference signal receiving and sending method. Therefore, for a effect that can be achieved by the network device, refer to the foregoing method embodiments. Details are not described herein again.

Optionally, an embodiment further provides a communication apparatus (where for example, the communication apparatus may be a chip or a chip system). The communication apparatus includes a processor, configured to implement the method in any one of the foregoing method embodiments. In a possible implementation, the communication apparatus further includes a memory. The memory is configured to store necessary program instructions and necessary data. The processor may invoke program code stored in the memory, to indicate the communication apparatus to perform the method in any one of the foregoing method embodiments. Further, the communication apparatus may not include a memory. When the communication apparatus is a chip system, the communication apparatus may include a chip, or may include a chip and another discrete component. This is not limited in this embodiment.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When computer program instructions are loaded and executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In the embodiments, the computer may include the apparatuses described above.

In the embodiments, a single processor or another unit may implement several functions.

Although the embodiments are described with reference to specific features in and of the embodiments, various modifications and combinations may be made to them without departing from the spirit and scope of the embodiments.

What is claimed is:

1. A reference signal sending method, wherein the method is used in a plurality of cycles whose cycle lengths are a first cycle length, the plurality of cycles comprise a first cycle and a second cycle, the first cycle and the second cycle each comprise M first durations, the first duration comprises N paging occasions, and location distribution of paging occasions in the first cycle is the same as location distribution of paging occasions in the second cycle, wherein M is a positive integer, and N is a positive integer greater than 1, and the method comprises:

determining, by a network device, a first target paging occasion that is in an $m^{th}$ first duration of the first cycle, wherein a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M;

determining, by the network device based on the first target paging occasion, a time domain resource that is in the $m^{th}$ first duration of the first cycle, wherein the time domain resource is a time domain resource of a time-frequency resource used to transmit a reference signal; and sending, by the network device, the reference signal to a terminal device on the time-frequency resource.

2. The method according to claim 1, wherein the determining, by a network device, of a first target paging occasion that is in an $m^{th}$ first duration of the first cycle comprises:

determining, by the network device, a first offset, wherein the first offset is used to indicate a location of the first target paging occasion in N paging occasions in the $m^{th}$ first duration of the first cycle; and determining, by the network device based on the first offset, the first target paging occasion that is in the $m^{th}$ first duration of the first cycle.

3. The method according to claim 2, wherein the first offset is determined based on a first parameter value, the first cycle length, and N; and the first parameter value is determined based on one or both of a sequence number of a frame from which the first cycle starts or a sequence number of a hyper frame to which the first cycle belongs; or the first parameter value is determined based on a cycle length of the reference signal and one or both of a sequence number of a frame from which the first cycle starts or a sequence number of a hyper frame to which the first cycle belongs.

4. The method according to claim 1, wherein the determining, by a network device, of a first target paging occasion that is in an $m^{th}$ first duration of the first cycle comprises:

determining, by the network device, a second parameter value based on R, PO_Index, and N, wherein the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs.

5. The method according to claim 1, wherein the determining of a first target paging occasion that is in an $m^{th}$ first duration of the first cycle comprises: determining a second parameter value, wherein the second parameter value satisfies:

second parameter value=(A1+B1*PO_Index+C1*R) mod N, wherein A1, B1, and C1 are all integers, and mod represents a modulo operation, wherein the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs.

6. The method according to claim 4, wherein PO_Index satisfies:

PO_Index=(A+(floor((B+SFN$_1$)*nB/T+C)+i_s) mod (nB), wherein A, B, and C are all integers, floor represents rounding down, SFN$_1$ represents the sequence number of the frame to which the paging occasion in the $m^{th}$ first duration of the first cycle belongs or the sequence number of the frame from which the first cycle starts, T represents the first cycle, mod represents a modulo operation, nB represents a paging density, and i_s represents an index of a sequence number of a subframe to which the paging occasion in the m$^{th}$ first duration of the first cycle belongs.

7. The method according to claim 1, wherein both the first cycle and the second cycle are discontinuous reception cycles.

8. A reference signal receiving method, wherein the method is used in a plurality of cycles whose cycle lengths are a first cycle length, the plurality of cycles comprise a first cycle and a second cycle, the first cycle and the second cycle each comprise M first durations, the first duration comprises N paging occasions, and location distribution of paging occasions in the first cycle is the same as location distribution of paging occasions in the second cycle, wherein M is a positive integer, and N is a positive integer greater than 1; and the method comprises:

determining, by a terminal device, a first target paging occasion that is in an m$^{th}$ first duration of the first cycle, wherein a relative location of the first target paging occasion in the first cycle is different from a relative location of a second target paging occasion in the second cycle, the second target paging occasion is a target paging occasion in an m$^{th}$ first duration of the second cycle, and m is any positive integer less than or equal to M;

determining, by the terminal device based on the first target paging occasion, a time domain resource that is in the m$^{th}$ first duration of the first cycle, wherein the time domain resource is a time domain resource of a time-frequency resource used to transmit a reference signal; and receiving, by the terminal device on the time-frequency resource, the reference signal that is from a network device.

9. The method according to claim 8, wherein the determining, by a terminal device, of a first target paging occasion that is in an m$^{th}$ first duration of the first cycle comprises:

determining, by the terminal device, a first offset, wherein the first offset is used to indicate a location of the first target paging occasion in N paging occasions in the m$^{th}$ first duration of the first cycle; and determining, by the terminal device based on the first offset, the first target paging occasion that is in the m$^{th}$ first duration of the first cycle.

10. The method according to claim 9, wherein the first offset is determined based on a first parameter value, the first cycle length, and N; and the first parameter value is determined based on one or both of a sequence number of a frame from which the first cycle starts or a sequence number of a hyper frame to which the first cycle belongs; or the first parameter value is determined based on a cycle length of the reference signal and one or both of a sequence number of a frame from which the first cycle starts or a sequence number of a hyper frame to which the first cycle belongs.

11. The method according to claim 8, wherein the determining, by a terminal device, of a first target paging occasion that is in an m$^{th}$ first duration of the first cycle comprises:

determining, by the terminal device, a second parameter value based on R, PO_Index, and N, wherein the second parameter value is used to indicate whether a paging occasion in the m$^{th}$ first duration of the first cycle is the first target paging occasion, N is a quantity of paging occasions in the m$^{th}$ first duration of the first cycle, PO_Index is an index of the paging occasion in the m$^{th}$ first duration of the first cycle, PO_Index is determined based on a sequence number of a frame to which the paging occasion in the m$^{th}$ first duration of the first cycle belongs or a sequence number of a frame from which the first cycle starts, and R is determined based on a sequence number of a hyper frame to which the paging occasion in the m$^{th}$ first duration of the first cycle belongs and the sequence number of the frame to which the paging occasion in the m$^{th}$ first duration of the first cycle belongs or based on the sequence number of the frame from which the first cycle starts and a sequence number of a hyper frame to which the first cycle belongs.

12. The method according to claim 8, wherein the determining of a first target paging occasion that is in an m$^{th}$ first duration of the first cycle comprises: determining a second parameter value, wherein the second parameter value satisfies:

second parameter value=(A1+B1*PO_Index+C1*R) mod N, wherein A1, B1, and C1 are all integers, and mod represents a modulo operation, wherein the second parameter value is used to indicate whether a paging occasion in the m$^{th}$ first duration of the first cycle is the first target paging occasion, N is a quantity of paging occasions in the m$^{th}$ first duration of the first cycle, PO_Index is an index of the paging occasion in the m$^{th}$ first duration of the first cycle, PO_Index is determined based on a sequence number of a frame to which the paging occasion in the m$^{th}$ first duration of the first cycle belongs or a sequence number of a frame from which the first cycle starts, and R is determined based on a sequence number of a hyper frame to which the paging occasion in the m$^{th}$ first duration of the first cycle belongs and the sequence number of the frame to which the paging occasion in the m$^{th}$ first duration of the first cycle belongs or based on the sequence number of the frame from which the first cycle starts and a sequence number of a hyper frame to which the first cycle belongs.

13. The method according to claim 11, wherein PO_Index satisfies:

PO_Index=(A+(floor((B+SFN$_1$)*nB/T+C)+i_s) mod (nB), wherein A, B, and C are all integers, floor represents rounding down, SFN$_1$ represents the sequence number of the frame to which the paging occasion in the m$^{th}$ first duration of the first cycle belongs or the sequence number of the frame from which the first cycle starts, T represents the first cycle, mod represents a modulo operation, nB represents a paging density, and i_s represents an index of a sequence number of a subframe to which the paging occasion in the m$^{th}$ first duration of the first cycle belongs.

14. The method according to claim 8, wherein both the first cycle and the second cycle are discontinuous reception cycles.

15. A communications apparatus, wherein the communications apparatus is used in a plurality of cycles whose cycle lengths are a first cycle length, the plurality of cycles comprise a first cycle and a second cycle, the first cycle and the second cycle each comprise M first durations, the first duration comprises N paging occasions, and location distribution of paging occasions in the first cycle is the same as location distribution of paging occasions in the second cycle, wherein M is a positive integer, and N is a positive integer greater than 1; and the communications apparatus comprises at least one processor and a transceiver, wherein the at least one processor is configured to determine a first target paging occasion that is in an $m^{th}$ first duration of the first cycle, wherein a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M;

the at least one processor is further configured to determine, based on the first target paging occasion, a time domain resource that is in the $m^{th}$ first duration of the first cycle, wherein the time domain resource is a time domain resource of a time-frequency resource used to transmit a reference signal; and the transceiver is configured to send the reference signal to a terminal device on the time-frequency resource.

16. The communications apparatus according to claim 15, wherein the at least one processor is configured to determine a first target paging occasion that is in an $m^{th}$ first duration of the first cycle comprises:

the at least one processor is configured to: determine a first offset, wherein the first offset is used to indicate a location of the first target paging occasion in N paging occasions in the $m^{th}$ first duration of the first cycle; and determine, based on the first offset, the first target paging occasion that is in the $m^{th}$ first duration of the first cycle.

17. The communications apparatus according to claim 15, wherein the at least one processor is configured to determine a first target paging occasion that is in an $m^{th}$ first duration of the first cycle comprises:

the at least one processor is configured to determine a second parameter value based on R, PO_Index, and N, wherein the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs.

18. A communications apparatus, wherein the communications apparatus is used in a plurality of cycles whose cycle lengths are a first cycle length, the plurality of cycles comprise a first cycle and a second cycle, the first cycle and the second cycle each comprise M first durations, the first duration comprises N paging occasions, and location distribution of paging occasions in the first cycle is the same as location distribution of paging occasions in the second cycle, wherein M is a positive integer, and N is a positive integer greater than 1; and the communications apparatus comprises at least one processor and a transceiver, wherein the at least one processor is configured to determine a first target paging occasion that is in an $m^{th}$ first duration of the first cycle, wherein a relative location of the first target paging occasion in the first cycle is different from a relative location of a second target paging occasion in the second cycle, the second target paging occasion is a target paging occasion in an $m^{th}$ first duration of the second cycle, and m is any positive integer less than or equal to M;

the at least one processor is further configured to determine, based on the first target paging occasion, a time domain resource that is in the $m^{th}$ first duration of the first cycle, wherein the time domain resource is a time domain resource of a time-frequency resource used to transmit a reference signal; and the transceiver is configured to receive, on the time-frequency resource, the reference signal that is from a network device.

19. The communications apparatus according to claim 18, wherein the at least one processor is configured to determine a first target paging occasion that is in an $m^{th}$ first duration of the first cycle comprises:

the at least one processor is configured to: determine a first offset, wherein the first offset is used to indicate a location of the first target paging occasion in N paging occasions in the $m^{th}$ first duration of the first cycle; and determine, based on the first offset, the first target paging occasion that is in the $m^{th}$ first duration of the first cycle.

20. The communications apparatus according to claim 18, wherein the at least one processor is configured to determine a first target paging occasion that is in an $m^{th}$ first duration of the first cycle comprises:

the at least one processor is configured to determine a second parameter value based on R, PO_Index, and N, wherein the second parameter value is used to indicate whether a paging occasion in the $m^{th}$ first duration of the first cycle is the first target paging occasion, N is a quantity of paging occasions in the $m^{th}$ first duration of the first cycle, PO_Index is an index of the paging occasion in the $m^{th}$ first duration of the first cycle, PO_Index is determined based on a sequence number of a frame to which the paging occasion in the $m^{th}$ first duration of the first cycle belongs or a sequence number of a frame from which the first cycle starts, and R is determined based on a sequence number of a hyper frame to which the paging occasion in the $m^{th}$ first duration of the first cycle belongs and the sequence number of the frame to which the paging occasion in the $m^{th}$ first duration of the first cycle belongs or based on the sequence number of the frame from which the first cycle starts and a sequence number of a hyper frame to which the first cycle belongs.

* * * * *